US011227179B2

(12) United States Patent
Rhodes et al.

(10) Patent No.: US 11,227,179 B2
(45) Date of Patent: Jan. 18, 2022

(54) VIDEO TRACKING WITH DEEP SIAMESE NETWORKS AND BAYESIAN OPTIMIZATION

(71) Applicant: Intel Corporation, Santa Clara, CA (US)

(72) Inventors: Anthony Rhodes, Portland, OR (US); Manan Goel, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 175 days.

(21) Appl. No.: 16/586,671

(22) Filed: Sep. 27, 2019

(65) Prior Publication Data

US 2020/0026954 A1    Jan. 23, 2020

(51) Int. Cl.
*G06K 9/00*    (2006.01)
*G06K 9/46*    (2006.01)
*G06N 3/08*    (2006.01)

(52) U.S. Cl.
CPC ....... *G06K 9/4671* (2013.01); *G06K 9/00718* (2013.01); *G06K 9/00744* (2013.01); *G06K 9/469* (2013.01); *G06N 3/08* (2013.01)

(58) Field of Classification Search
CPC .. G06K 9/4671; G06K 9/00744; G06K 9/469; G06K 9/00718; G06K 9/00711; G06K 9/4628; G06K 9/6271; G06K 2009/3291; G06K 9/00369; G06K 9/6215; G06K 9/34; G06N 3/08; G06N 5/003; G06N 7/005; G06N 3/0454

USPC ............................................... 382/103
See application file for complete search history.

(56) References Cited

U.S. PATENT DOCUMENTS

2015/0178568 A1* 6/2015 Shellshear .............. G06T 7/248
382/103

OTHER PUBLICATIONS

Rohith Gandhi, "Siamese Network and Triplet Loss", retrieved from towardsdatascience.com/Siamese-network-triplet-loss-b4ca82c1aec8, May 16, 2018, 4 pages.

* cited by examiner

*Primary Examiner* — Charlotte M Baker
(74) *Attorney, Agent, or Firm* — Jordan IP Law, LLC

(57) ABSTRACT

An apparatus, method, system and computer readable medium for video tracking. An exemplar crop is selected to be tracked in an initial frame of a video. Bayesian optimization is applied with each subsequent frame of the video by building a surrogate model of an objective function using Gaussian Process Regression (GPR) based on similarity scores of candidate crops collected from a search space in a current frame of the video. A next candidate crop in the search space is determined using an acquisition function. The next candidate crop is compared to the exemplar crop using a Siamese neural network. Comparisons of new candidate crops to the exemplar crop are made using the Siamese neural network until the exemplar crop has been found in the current frame. The new candidate crops are selected based on an updated surrogate model.

25 Claims, 12 Drawing Sheets

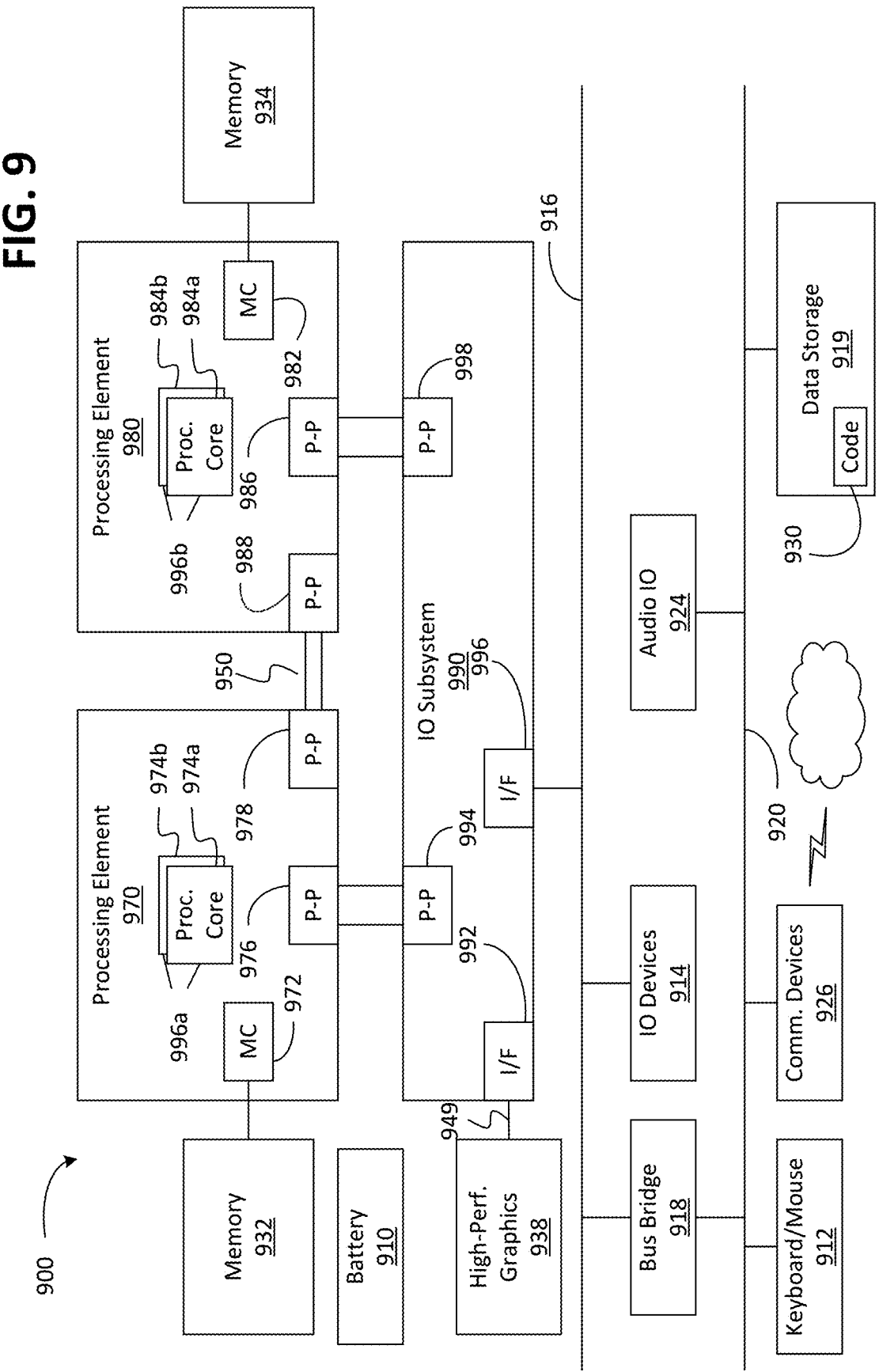

VIDEO TRACKING WITH DEEP SIAMESE NETWORKS AND BAYESIAN OPTIMIZATION

TECHNICAL FIELD

Embodiments generally relate to computer vision. In particular, embodiments relate to video tracking. More particularly, embodiments relate to efficient video tracking using deep Siamese networks and Bayesian optimization.

BACKGROUND

Early video tracking approaches include feature-based approaches and template matching algorithms that attempt to track specific features of an object or even the object as a whole. Feature-based approaches use local features, including points and edges, keypoints, SIFT (Scale-Invariant Feature Transform), HOG (Histogram of Oriented Gradients) features and deformable parts. Conversely, template-based matching takes the object as a whole, offering the potential advantage of treating complex templates or patterns that cannot be modeled by local features alone.

Recently, deep learning models have been applied to video tracking to leverage the benefits of learning complex functions from large data sets. While deep learning models offer the potential of improved robustness for tracking, they present two significant challenges to video tracking. First, many deep learning tracking models are too slow for practical use because they require online training. Second, many deep learning tracking models, when trained offline, are based on classification approaches, so that they are limited to class-specific searches and frequently require the aggregation of many image patches, and thus many passes through the network, in order to locate the object. In light of these two difficulties, several contemporary state-of-the-art deep learning-based tracking models have been developed as generic object trackers in an effort to obviate the need for online training and also to improve the generalization of the tracker. A recent state-of-the-art model applies a regression-based approach to train a generic tracker, GOTURN, offline to learn a generic relationship between appearance and motion. Several deep learning techniques additionally incorporate motion and occlusion models, including particle filtering and optical flow.

Even with the recent successes in video tracking, there is still a void in state-of-the-art video tracking workflows that fully integrate deep learning techniques with classical statistics and machine learning approaches. Most state-of-the-art video trackers lack, for instance, a capacity to generate systematic belief states (e.g., through explicit error and uncertainty measures), or ways to seamlessly incorporate contextual and scene structure, or to adaptively encode temporal information (e.g., by imposing intelligent search stopping conditions and bounds) and the ability to otherwise directly and inferentially control region proposal generation or sampling methods in a precise and principled way.

BRIEF DESCRIPTION OF THE DRAWINGS

The various advantages of the embodiments will become apparent to one skilled in the art by reading the following specification and appended claims, and by referencing the following drawings, in which:

FIG. 9 is a block diagram of an exemplary computing system according to an embodiment.

Figure 1A:
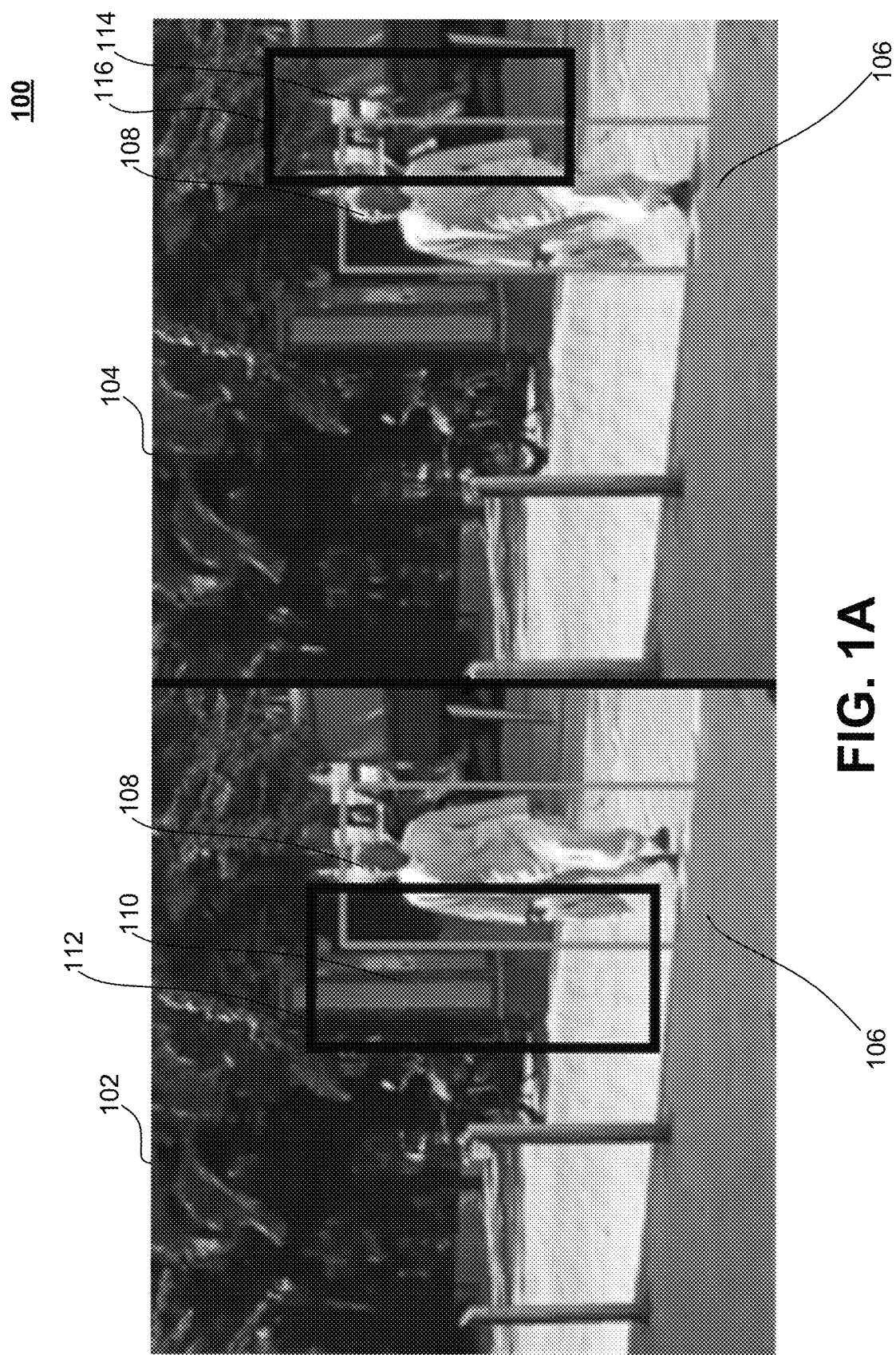
FIG. 1A is a diagram illustrating a simplified process for video tracking an object in a video clip according to an embodiment.

In the following detailed description, reference is made to the accompanying drawings which form a part hereof wherein like numerals designate like parts throughout, and in which is shown by way of illustration embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents. In an all in all in all.

DESCRIPTION OF EMBODIMENTS

Technology to provide a statistically-principled approach to object tracking that integrates a deep learning neural network model with a dynamic Bayesian optimization framework to enable intelligent computer vision systems capable of high-level vision tasks such as, for example, scene and behavior understanding. The robustness of deep learning combined with the efficiency of Bayesian optimization produces an accurate tracker that requires a minimal number of object queries. Together, the combination generates confidence and uncertainty measures that guide a localization process by balancing prior knowledge with new query information.

The video tracking problem is treated as a dynamic (i.e., temporally evolving) optimization problem. Embodiments employ a deep Siamese network to provide a similarity function with respect to a reference object to be tracked. A dynamic Bayesian optimization framework is applied to efficiently locate the object in subsequent frames of the video. The Bayesian optimization framework encodes spatio-temporal information for efficient object tracking in video. Temporal coherence is enforced in the tracking output through the use of a dynamic, temporally-evolving, objective function. Using Gaussian Process priors, the dynamic objective function is modeled, representing the location of a tracked object in each frame of the video. By exploiting temporal correlations, the search space of a video frame is queried in a statistically principled and efficient way to minimize the number of times an image is pushed through the Siamese network. This is accomplished by using an acquisition function, defined from the modeled dynamic objective function, to decide where to sample next in the search space of the video frame.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device). As used herein, the term "logic" and "module" may refer to, be part of, or include an application specific integrated circuit (ASIC), an electronic circuit, a processor (shared, dedicated, or group), and/or memory (shared, dedicated, or group) that execute one or more software or firmware programs having machine instructions (generated from an assembler and/or a compiler), a combinational logic circuit, and/or other suitable components that provide the described functionality.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

Video tracking is used in a wide variety of applications in computer vision, such as, video compression, video surveillance, vision-based control, human computer interfaces, medical imaging, augmented reality, and robotics. Video tracking enables an exemplar object identified in an initial frame of a video clip to be automatically located and tracked in each successive frame of the video clip. A video clip may consist of at least two or more frames, and in some cases may include one hundred or more frames. The exemplar object is identified in the initial frame using a bounding box. The bounding box is a rectangle that is drawn around the exemplar object at a true center coordinate x in the initial frame of the video clip. The exemplar object, also referred to as an exemplar crop, is tracked in subsequent frames by identifying a candidate crop thought to be the equivalent of the exemplar crop. Tracking in subsequent frames is measured using an IOU (Intersection of Union) metric. The IOU metric consists of a number between zero (0) and one (1). If the IOU in a subsequent frame is 0, then there is no overlap measured between the candidate crop and the exemplar crop. If the IOU in a subsequent frame is 1, then the overlap measured between the candidate crop and the exemplar crop is perfect, meaning that the exemplar object has been accurately identified in the subsequent frame.

FIG. 1A is a diagram illustrating video tracking of an object in a video clip 100 according to an embodiment. For simplistic reasons, the diagram only shows two subsequent frames of the video clip 100. The video clip 100 shows a first subsequent video frame 102 followed by a second subsequent video frame 104. Video frames 102 and 104 are in sequence. Video frames 102 and 104 include a plurality of objects with an exemplar object 106 identified as having a white bounding box (i.e., the true bounding box) drawn around a pedestrian 108 as an indication that the pedestrian 108 is the object being tracked. Although not shown in FIG. 1A, in an initial frame of the video clip 100, a black bounding box was drawn around the pedestrian 108 to indicate the pedestrian 108 as the exemplar object to be tracked throughout each frame of the video clip. The black bounding box drawn around the pedestrian in the initial frame has a true center coordinate x. In the subsequent video frame 102 of FIG. 1A, a candidate crop 110 is identified using a black bounding box 112. The black bounding box 112 partially overlaps with the right side of pedestrian 108 and is therefore several pixels to the left of center x of the true bounding box. Thus, the candidate crop 110 would result in an IOU metric somewhere between 0 and 0.25. In the subsequent video frame 104 that occurs immediately after frame 102 in the video clip 100, a candidate crop 114 is identified using a black bounding box 116. The black bounding box 116 partially overlaps with the upper left side of pedestrian 108 and is therefore several pixels to the right of center x of the true bounding box. Thus, the candidate crop 114 would result in an IOU metric somewhere between 0 and 0.2.

In embodiments, multiple candidate crops may be sampled in each subsequent frame in order to find a candidate crop that yields the highest similarity to the exemplar crop. This is accomplished using a Siamese neural network. A sample candidate crop is passed through the Siamese network to obtain a similarity score. Bayesian optimization is used to efficiently sample a space of candidate crops where the exemplar object may be located based on prior similarity scores. For example, in a frame in which the selected candidate crops are identified as having similarity scores between 0.5 and 0.8, the candidate crop with a similarity score of 0.8 will be chosen for that frame as identifying the location of the exemplar object. The next frame will build upon previous frame locations of where the exemplar object is located to determine where to look next in sampling candidate crops for that frame. In other words, embodiments utilize temporal coherence when tracking an object from one frame to the next. This process repeats for each frame of the video clip 100.

Figure 1B:
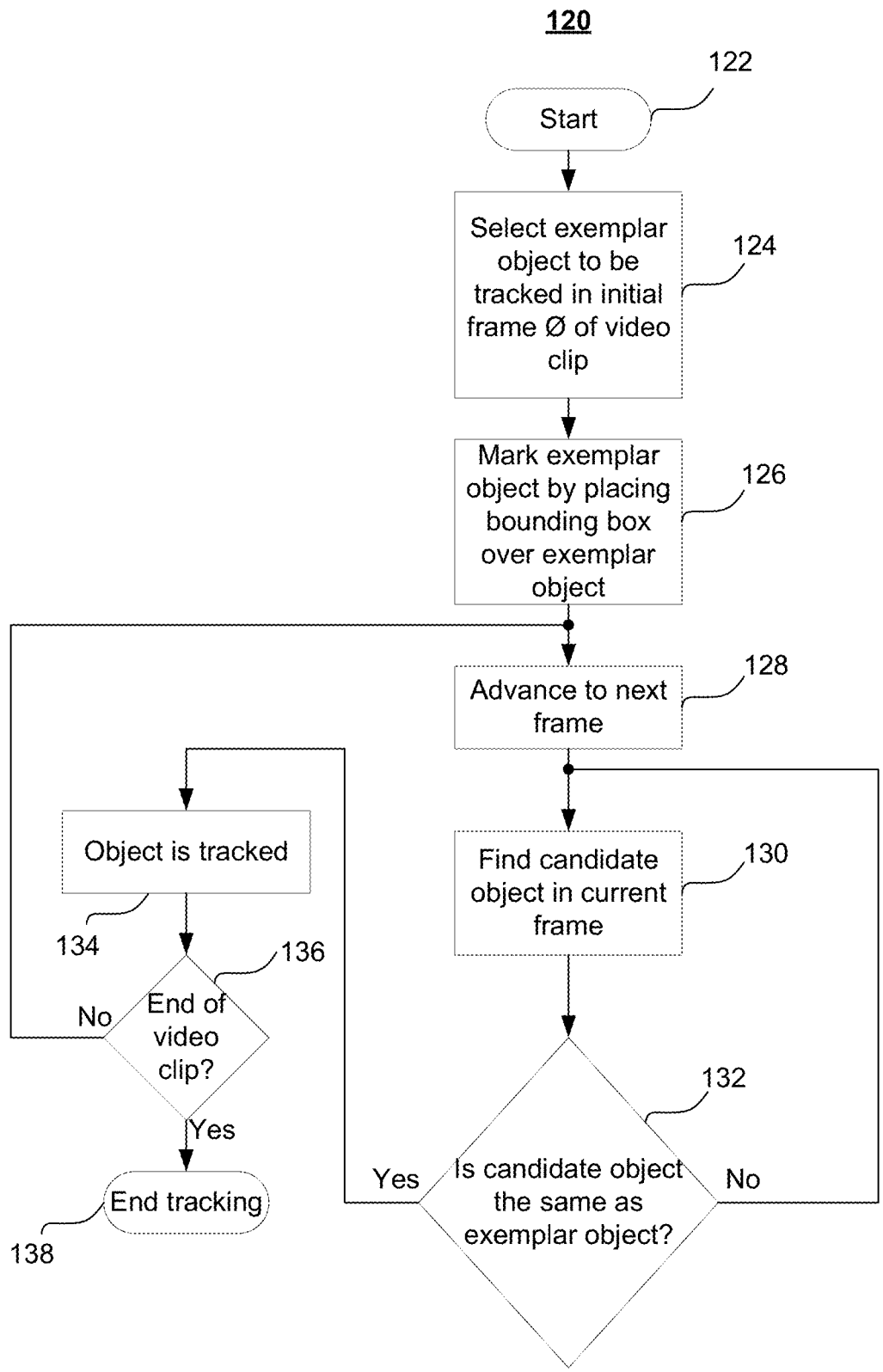
FIG. 1B is a simplified flow diagram of a method of tracking an object in a video clip according to an embodiment.

FIG. 1B is a simplified flow diagram of an exemplary method 120 for video tracking an object in a video clip according to an embodiment. The method 120 may generally be implemented in a computer system such as, for example, the computer system 600 as described below with reference to FIG. 6. More particularly, the method 120 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), and fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 120 may be written in any combination of one or more programming languages, including an object-oriented programming language such as JAVA, SMALLTALK, C++ or the like and conventional procedural programming languages, such as the "C" programming language or similar programming languages. Additionally, logic instructions might include assembler instruction, instruction set architecture (ISA) instructions, machine instruction, machine depended instruction, microcode, state setting data, configuration data for integrated circuitry, state information that personalizes electronic circuitry and/or other structural components that are native to hardware (e.g., host processor, central processing unit (CPU), microcontroller, etc.). The process begins in block 122, where it immediately proceeds to block 124.

In block 124, an object to be tracked is selected from an initial frame zero of video clip. The selected object is referred to as an exemplar crop. The process then proceeds to block 126.

In block 126, a bounding box is placed over the exemplar crop at center coordinate x. The process then proceeds to block 128.

In block 128, the video clip is advanced to the next frame. The process then proceeds to block 130.

In block 130, an object is identified in the current frame as the object to be tracked. The object is referred to as a candidate crop. The process then proceeds to decision block 132.

In decision block 132, it is determined whether the candidate crop is the same as the exemplar crop. If it is determined that the candidate crop is not the same as the exemplar crop, the process proceeds back to block 130 to determine a new candidate crop for the current frame.

Returning to decision block 132, if it is determined that the candidate crop is the same as the exemplar crop, the process proceeds to block 134. In block 134, the object is identified as being tracked and the tracking data is saved for the current frame. The process then proceeds to decision block 136.

In decision block 136, it is determined whether the current frame is the end of the video clip. If the current frame is not the end of the video clip, the process then proceeds back to block 128 where the video clip is advanced to the next frame.

Returning to decision block 136, if the current frame is the end of the video clip, the process proceeds to block 138, where the tracking process ends.

The above described process may seem easy but locating the object to be tracked in each successive frame can be expensive as well as time-consuming. To provide a more efficient process for video tracking, embodiments integrate a dynamic Bayesian optimization framework in conjunction with deep learning for video object tracking. A deep Siamese neural network is used to provide a similarity function with respect to a reference object to be tracked. A dynamic Bayesian optimization procedure (i.e., a temporally-evolving Gaussian process) is then applied to efficiently locate the object in subsequent frames.

Siamese neural networks were chosen for several reasons. First, they can generalize beyond what they were trained on, thus, enabling them to differentiate between classes they were not exposed to during training. And because they can generalize to classes they were not trained on; Siamese networks do not need to be retrained every time they are required to differentiate between something new. Instead of being trained to recognize what an image is, Siamese networks learn a similarity function that allows them to differentiate images. They do not perform classification, and therefore require very little training. In fact, they are easy to train.

Figure 2A:
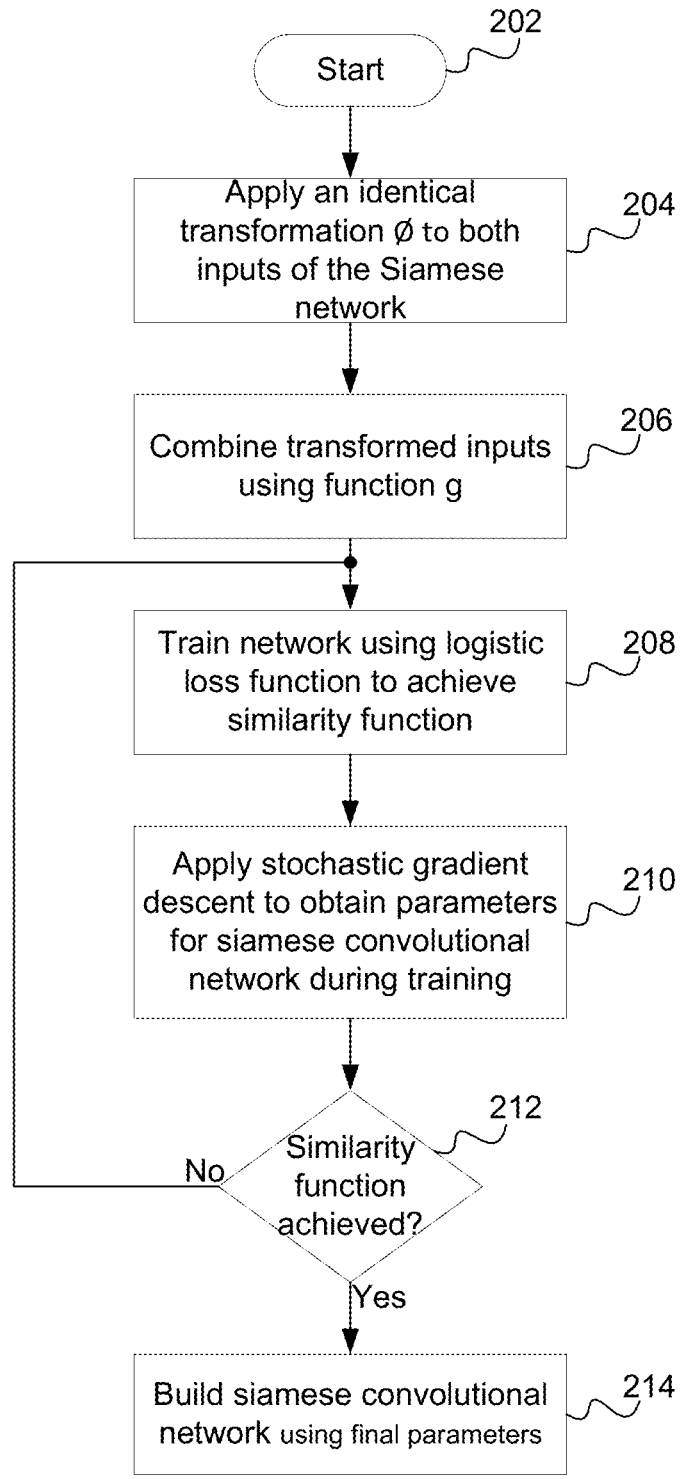
FIG. 2A is a flow diagram of a method of training a Siamese network according to an embodiment.

FIG. 2A is a flow diagram illustrating an exemplary method 200 for training a Siamese network according to an embodiment. The method 200 may generally be implemented in a computer system such as, for example, the computer system 600 as described below with reference to FIG. 6. More particularly, the method 200 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field-programmable gate arrays (FPGAs), complex programmable logic devices (CPLDs), and fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 200 may be written in any combination of one or more programming languages, including an object-oriented programming language such as JAVA, SMALLTALK, C++ or the like and conventional procedural programming languages, such as the "C" programming language or similar programming languages. Additionally, logic instructions might include assembler instruction, instruction set architecture (ISA) instructions, machine instruction, machine depended instruction, microcode, state setting data, configuration data for integrated circuitry, state information that personalizes electronic circuitry and/or other structural components that are native to hardware (e.g., host processor, central processing unit (CPU), microcontroller, etc.).

A Siamese network architecture is composed of two identical networks, with each network coupled to a different input to compare the similarity between an exemplar image Z and a candidate image X. The training objective is for the network to learn a general similarity function, f (z, x), for object tracking that compares an exemplar crop Z to a candidate crop X and returns a similarity score. If the similarity score is a high score, the two images depict the same object. If the similarity score is a low score, the two images depict different objects. The process begins in block 202 where the process immediately proceeds to block 204.

In block 204, the Siamese network applies an identical transformation 1 to both exemplar image Z and candidate image X. The transformation allows for the inputs to be represented in a manner that is useful for the task of determining whether the objects are similar or not. The process then proceeds to block 206.

In block 206, the transformed representations of the two input images are then combined using a function g that is trained to learn the general similarity function on deep convolutional network features, such that $f(z, x) = g(\varphi(z), \varphi(x))$. The process then proceeds to block 208.

In block 208, the network is trained on positive and negative pairs using a logistic loss function $l(y, v) = \log(1 + \exp(-yv))$, where v is the real-valued score of an exemplar-candidate pair and $y \in \{-1, +1\}$ is its ground truth label. In other words, y indicates whether the candidate image X corresponds with the same object as the exemplar image Z. When the network is given a candidate image X that is similar to the exemplar image Z, y should yield a +1. When the network is given a candidate image X that is different from exemplar image Z, y should yield a −1.

The loss function $l(y, v)$ is chosen to encapsulate the task that the network is to learn. When the loss is small, the network is doing a good job on carrying out the desired task. When the loss is big, the network is not doing a good job on carrying out the desired task. Thus, when the overall loss function is minimized, a good similarity function is achieved.

The positive and negative pairs use images of the same object as exemplar image Z and images X of objects that are different from exemplar image Z. For example, if exemplar image Z is an image of a person, then positive pairs would use images of that person and negative pairs might use images of a different person or a different object. Positive image exemplars were defined as a function of the center offset distance from the ground truth and a network stride length. Image sizes were normalized for consistency during training. The process then proceeds to block 210.

In block 210, during training of the Siamese network, network parameters are calculated and updated by applying Stochastic Gradient Descent to:

$$\arg\min_\theta E_{(z,x,y)}[l(y, f(z, x; \theta))],$$

where $E_{(z,x,y)}$ represents a statistical average that is computed over the data distribution, and the parameters of the Siamese network, such as, for example, the weights and the biases of the network, are summarized by the variable θ. This finds parameter values of the network that minimize the expected loss. As previously indicated, the loss is defined by the task; given an exemplar Z and a candidate X, determine whether the candidate X is of the same object found in exemplar Z. In other words, the training process finds the correct weights for the network that minimize the difference in the loss between y, which is the true value, and f, which is the value predicted by the network. The process then proceeds to decision block 212.

In decision block 212, it is determined whether a good similarity function has been achieved by the Siamese network. A good similarity function is achieved when the overall loss function is minimized. If it is determined that a good similarity function has not been achieved, then the process proceeds back to block 208, where the Siamese network continues to be trained and the parameters (θ) of the network continue to be calculated and updated (in block 210).

Returning to block 212, if it is determined that a good similarity function has been achieved, the process proceeds to block 214, where the final parameters obtained from the training can be implemented in the Siamese convolutional network.

Figure 2B:
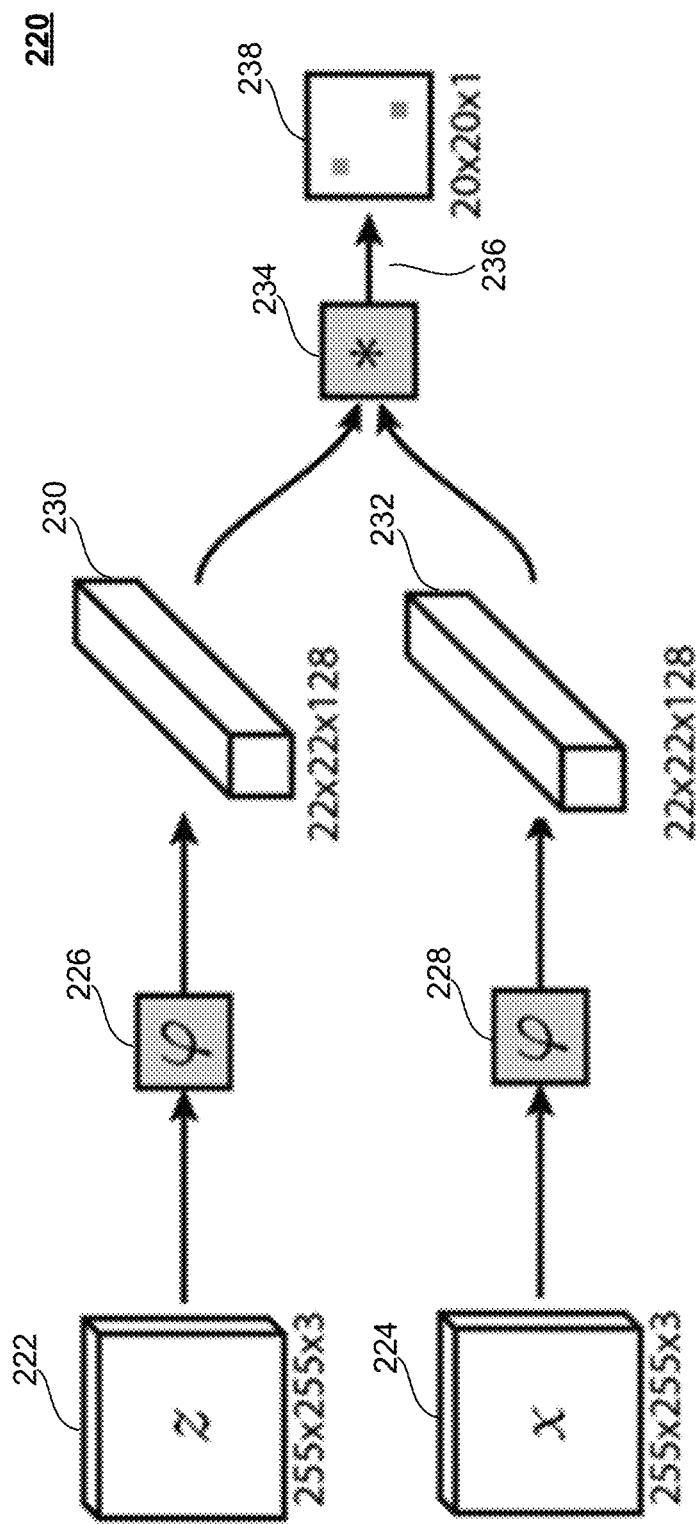
FIG. 2B is a simplified block diagram for determining similarity between two objects according to an embodiment.

FIG. 2B is a simplified block diagram 220 for determining similarity between two objects according to an embodiment. Diagram 220 shows a first input 222 and a second input 224. The first input 222 comprises the exemplar image Z or reference image. The second input 224 comprises the candidate image X. In one embodiment, exemplar image Z and candidate image X are both 255×255×3 in size, indicating that the images are square images with red, green and blue color channels. First and second inputs 222 and 224 are each passed to networks 226 and 228, respectively, where they are transformed into an internal representation, shown as output tensors 230 and 232, that is useful for the task of determining whether the input images are similar or not. Thus, the dimensions of the output tensors 230 and 232 are 22×22×128, which has a smaller height and length, but and a larger depth. The output tensors 230 and 232 are convolved at 234 to generate a similarity score output 236. Similarity scores for a batch of sample images are later rendered in a 20×20×1 search grid, shown as 238, using a Gaussian process.

The architecture of a Siamese network is very simple. It consists of symmetric twin networks that are joined together by a conjoining layer at the top of the network. In one embodiment, the twin networks may each use a five-layer Cony-Net (convolutional network) architecture, with pooling layers after the first and second layers, and stride lengths of two and one throughout. It is well known to one skilled in the relevant art(s) that cony-nets are typically used in Siamese networks when the data involves images.

As previously indicated above, embodiments use the Siamese network as a deep learning approach to video tracking by receiving crops of an image where an object may be located in a frame and scoring that crop with an exemplar crop to see if there's a good match. One could do an exhaustive search of each frame in the video by taking all of the crops from a frame and passing each crop through the Siamese network to obtain similarity scores for each crop in comparison to the exemplar crop, and whichever crop yields the highest similarity score could be confidently chosen as the location of the object being tracked. This would obviously be very inefficient as it would require millions and millions of crops to be passed through the Siamese network for tracking an object throughout every frame of the video. Passing every crop from an entire frame through the Siamese network is computationally expensive as well as time-consuming. Thus, frames could not be processed in real time due to the enormous amount of crops in each frame.

In order to be very efficient with regards to sampling a search space to locate where the object to be tracked could potentially be in the subsequent frames of the video, embodiments use a technique called Dynamic Bayesian Optimization. Bayesian optimization finds the maximum value of an unknown function using statistical principles. The reason it's called Dynamic Bayesian Optimization in the instant case is because the function to be optimized is a location of the object to be tracked in the video from one frame to the next, which changes temporally. In other words, the location of the object changes over time.

Object tracking in video is defined as a dynamic optimization problem (DOP):

$$DOP=\{\max f(x, \text{s.t.} x \in F(t) \subset S, t \in T\}$$

where:
- $S \in \mathbb{R}^D$, with S in the search space;
- $f: S \times T \to \mathbb{R}$ is the temporally-evolving objective function which yields a maximum when the input x matches the ground-truth of the target object; F(t) is the set of all feasible solutions $x \in F(t) \subset S$ at time t.

Figure 3A:
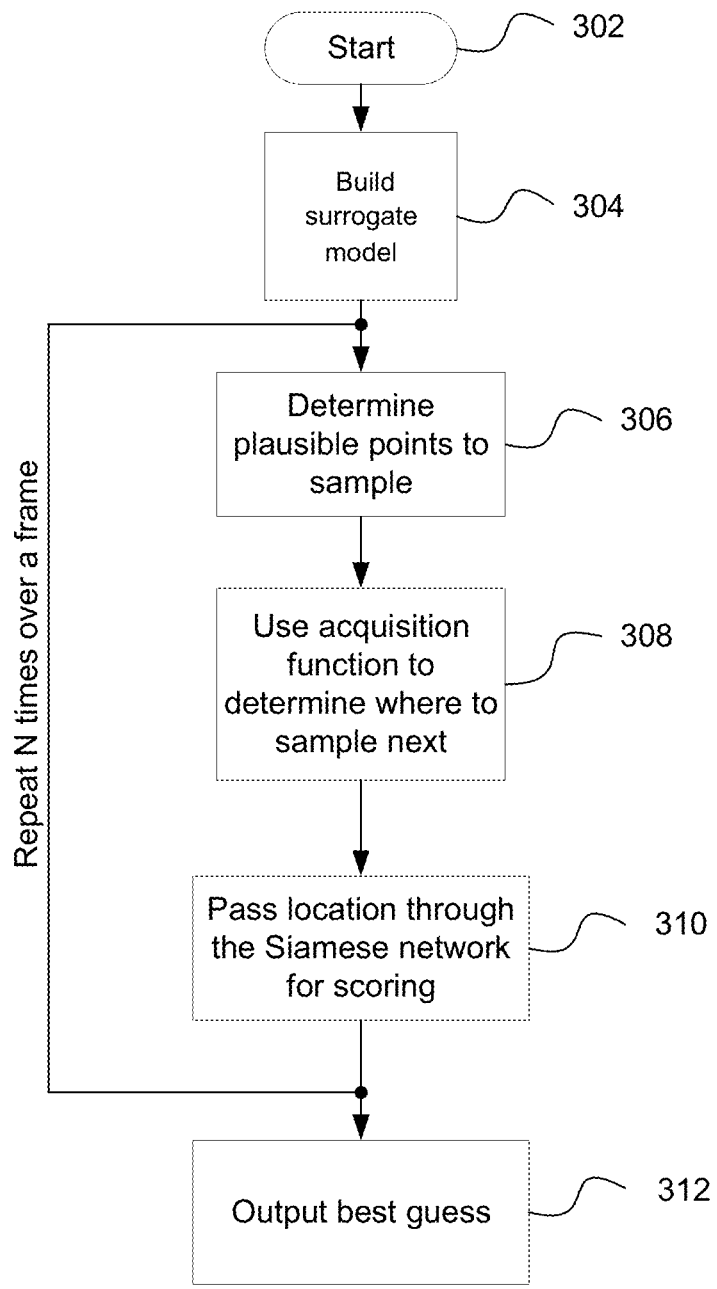
FIG. 3A is a flow diagram of a method of incorporating Bayesian optimization with deep learning to track an object in a video according to an embodiment.

FIG. 3A is a flow diagram of a method 300 of incorporating Bayesian optimization with deep learning to track an object in a video according to an embodiment. The method 300 may generally be implemented in a computer system such as, for example, the computer system 600 as described below with reference to FIG. 6. More particularly, the method 300 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, and fixed-functionality logic hardware using circuit technology such as, for example, ASIC, CMOS or TTL technology, or any combination thereof.

For example, computer program code to carry out operations shown in the method 300 may be written in any combination of one or more programming languages, including an object-oriented programming language such as JAVA, SMALLTALK, C++ or the like and conventional procedural programming languages, such as the "C" programming language or similar programming languages. Additionally, logic instructions might include assembler instruction, instruction set architecture (ISA) instructions, machine instruction, machine depended instruction, microcode, state setting data, configuration data for integrated circuitry, state information that personalizes electronic circuitry and/or other structural components that are native to hardware (e.g., host processor, central processing unit (CPU), microcontroller, etc.).

The process begins in block 302, where the process immediately proceeds to block 304. In block 304, a surrogate model is built to learn a latent objective function from collected samples of candidate crops from a frame in a video. Similarity scores for each sample are obtained by passing the candidate crops in sequence through the Siamese network to obtain several different similarity scores for the frame. The similarity scores are used to draw a graph (i.e., surrogate model) over the image to obtain a best guess estimate as to what the similarity scores would be in places where candidate crops were not extracted and passed through the Siamese network. The graph drawn over the image formulates hills and valleys indicative of the similarity scores for a frame, wherein the higher the similarity score, the more promising a candidate crop at that location may be the true exemplar object to be tracked. Gaussian Process Regression (GPR) is used to render the surrogate model. The uncertainty in the surrogate is quantified using GPR. The process then proceeds to block 306.

In block 306 plausible points to sample from the objective function are determined in the search space based on the surrogate model. The process then proceeds to block 308.

In block 308, a secondary optimization of a surrogate dependent acquisition function a(x, t) is used to decide where to obtain the next sample in the frame. The acquisition function strikes a balance between exploring new regions in the search space and exploiting information obtained from previous samples of the objective function. A novel acquisition function, memory-score expected-improvement (MS-EI), was derived as follows:

$$\text{MS-EI}=(\mu(x))-f(x^*)-\xi)\Phi(Z)+\sigma(x)\rho(Z)$$

where:
- $Z=(\mu(x)-f(x^*)-\xi)/\sigma(x)$;
- $x^*=\text{argmax } f(x)$;
- $\Phi$ and $\rho$ denote the PDF (Probability Distribution Function) and CDF (Cumulative Distribution Function) of the standard normal distribution, respectively; and
- $\xi=(\alpha \cdot \text{mean}[f(x)]_D \cdot n^q)^{-1}$ $\alpha$ and q are tunable parameters that depend on the scale of the objective function. In one embodiment, $\alpha=1$, $q=1.1$. D denotes the sample data set, and n is the sample iteration number, with $|D|=n$; $\text{mean}[f(x)]_D$ is the sample mean of the previously observed values $\xi$ serves to balance the exploration-exploitation trade-off to the specificity of a particular search. Thus, MS-EI employs a cooling schedule so that exploration is encouraged early in the search; however, the degree of exploration is conversely dynamically attenuated for exploitation as the search generates sample points with larger output values. $\mu(x)$ is the expected score of a particular crop x without passing the crop through the Siamese network. $\sigma(x)$ encodes the uncertainty of the particular prediction for $\mu(x)$.

The acquisition function is used to decide where to look next to obtain a sample crop to track the exemplar object in the frame. In other words, what's the most promising location to look in the image to find the exemplar object. The acquisition function is a much cheaper function to evaluate than using the Siamese network. The acquisition function is applied to an entire search space. This can be done instantaneously, and is therefore, a cheap function to apply vs. passing each crop through the Siamese network. It is applied over all possible crops in the search space of the frame, and provides a best guess approximation as to what the Siamese network would indicate as a true similarity score if the crops actually passed through the Siamese network. The crop with the highest acquisition result is selected as the next sample. That crop is extracted from its location and passed through the Siamese network to obtain a new similarity score. The graph is then updated with the new similarity score from the Siamese network for the extracted crop.

In one embodiment, the process of finding a new sample using the acquisition function, obtaining a crop based on the new sample, and passing the crop through the Siamese network to obtain a similarity score is repeated N times and the highest similarity score is chosen as the location of the object to be tracked in that frame. The process then proceeds back to block 304 to find the exemplar object in the next frame of the video.

In another embodiment, the process of finding a new sample using the acquisition function, obtaining a crop based on the new sample, and passing the crop through the Siamese network to obtain a similarity score is repeated until a confidence level is sufficiently high that the crop for the current location is the best guess of where the exemplar object is located in the frame. The process then proceeds back to block 304 to find the exemplar object in the next frame of the video.

In one embodiment, the search space may be a 20×20 image grid to allow the process to execute in real-time or close to real-time. In other embodiments, the user may choose a different search space based on one or more of the demands of the problem being solved, the resolution of the images and the hardware used.

Using the acquisition function to obtain a best guess approximation of what the Siamese network would indicate as the true similarity score minimizes the number of times needed to push an image crop through the Siamese network while efficiently sampling where the object could be located in a frame for video tracking in a timely manner.

A Gaussian process (GP) defines a prior distribution over functions with a joint NORMALITY assumption. $\hat{f}$ is denoted as the realization of the Gaussian process: $\hat{f} \sim GP(\mu, K)$. GP is fully specified by the mean $\mu: X \rightarrow \mathbb{R}$ and covariance $K: X \times X \rightarrow \mathbb{R}$, $K((x, t), (x', t')) = E[(\hat{f}(x, t) - \mu(x, t))(\hat{f}(x', t') - \mu(x', t'))]$, where $K(\bullet, \bullet) \leq 1$ and $X = S \times T$. $\mu$ is the average, the best guess as to what the Siamese network would score that region or that crop if it was actually passed through the Siamese network. K, the covariance or kernel function, indicates similarity of nearby points. For example if one point in the search space gets a score of 0.8, then the neighboring points should have scores close to 0.8. Thus, K enforces a continuity for the Gaussian process.

DOP f(x, t) is modeled as a spatio-temporal GP where the objective function at time t represents a slice off constrained at t. The dynamic GP model encapsulates statistical correlations in space and time. Furthermore, the GP may enable tracking the location of an object expressed as the temporally-evolving maximum of the objective function f(x, t).

In one embodiment, $\hat{f}(x, t) \sim GP(0, K(\{x, t\}, \{x', t'\}))$, where $(x, t) \in \mathbb{R}^3$ (x is the bounding-box spatial location), and K is the covariance function of the zero-mean spatio-temporal GP. For simplicity, we assume that K is both stationary and separable of the form:

$$K(\hat{f}(x,t), \hat{f}(x',t')) = K_S(x,x') \cdot K_T(t,t')$$

where $K_S$ and $K_T$ are the spatio and temporal covariance functions, respectively. In one embodiment, Matern kernel functions are used in experiments and to train the spatial and temporal covariance functions independently, following separable assumptions. Matern kernel functions are well known to one skilled in the relevant art(s).

Figure 3B:
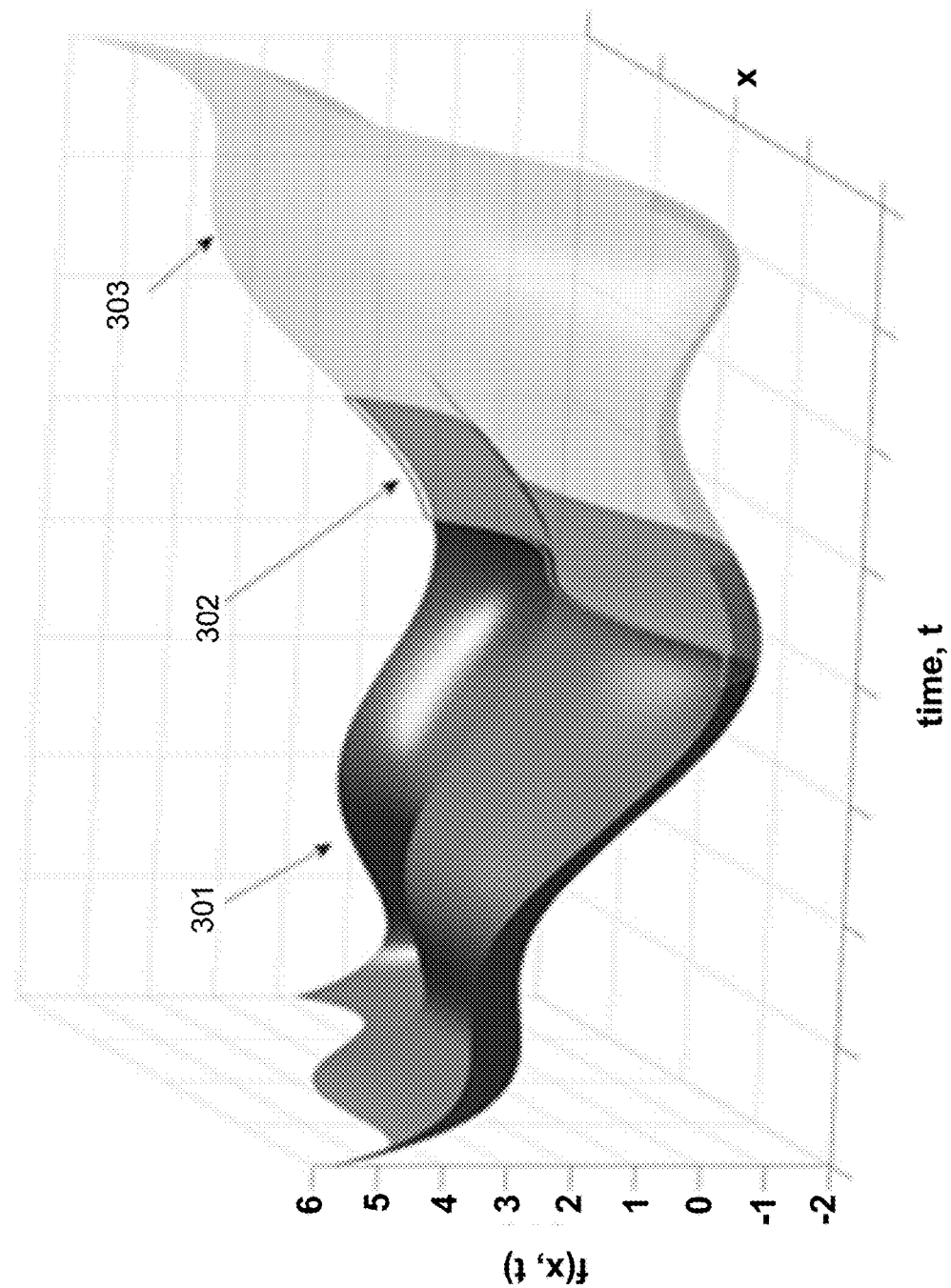
FIG. 3B is a graph illustrating $\hat{f}(x, t)$ for DOP according to an embodiment.

FIG. 3B is a diagram 320 illustrating $\hat{f}(x, t)$ for DOP according to an embodiment. Diagram 320 is an example of the graph drawn at blocks 304 and 308 of FIG. 3A above in determining where to obtain the next sample. Diagram 320 illustrates the dynamic Gaussian process to video tracking over time. The vertical axis represents function $\hat{f}(x, t)$ while the horizontal axis represents time. Slicing function $\hat{f}(x, t)$ along a line perpendicular to the time axis represents $\hat{f}(x, t)$ for a particular frame. When determining the next sample, one would like for $\hat{f}(x, t)$ to be as large as possible over time. In tracking an object, one chooses the optimal location of the object not only with respect to the current frame object, but also with respect to all of the information gathered from previous frames. This enables one to predict what will happen in future frames as well.

References 302 illustrates data from the current frame in which the system is trying to find the exemplar object and draw a bounding box around that object. Reference 301 illustrates data from all of the previous frames which may be useful in locating the exemplar object in the current frame. Reference 303 illustrates estimated data for future frames based on all of the data from the current frame 302 and previous frames 301.

A Siamese-Dynamic Bayesian Tracking Model (SDBTM) utilizes the deep Siamese cony-net, previously described above, as a general object similarity function in combination with a Dynamic Bayesian Optimization (BO) framework to encode spatio-temporal information for efficient object tracking in video. The deep Siamese cony-net is trained to obtain the general object similarity function. The target object to be tracked is selected in the initial frame, at t=0 of the video, where the video contains T total frames. The target object is identified as being located within a ground truth bounding box centered at x. The GPR approximation is rendered over a resized search grid of size d×d, where, in one embodiment, d=20 for computational efficiency. One skilled in the relevant art(s) would know that the value of d is not limited to 20. In other embodiments, other values for d may be used that also provide computational efficiency. Subsequently, upscaling is applied over the original search space dimensions. To allow for changes in the scale of the target object, each evaluation of an image crop is rendered by the Siamese network as a triplet score, where the similarity score is computed for the current crop compared to the exemplar crop at three scales: {1.00−p, 1.00, 1.00+p}, where p is heuristically set at 0.05.

Figure 4:
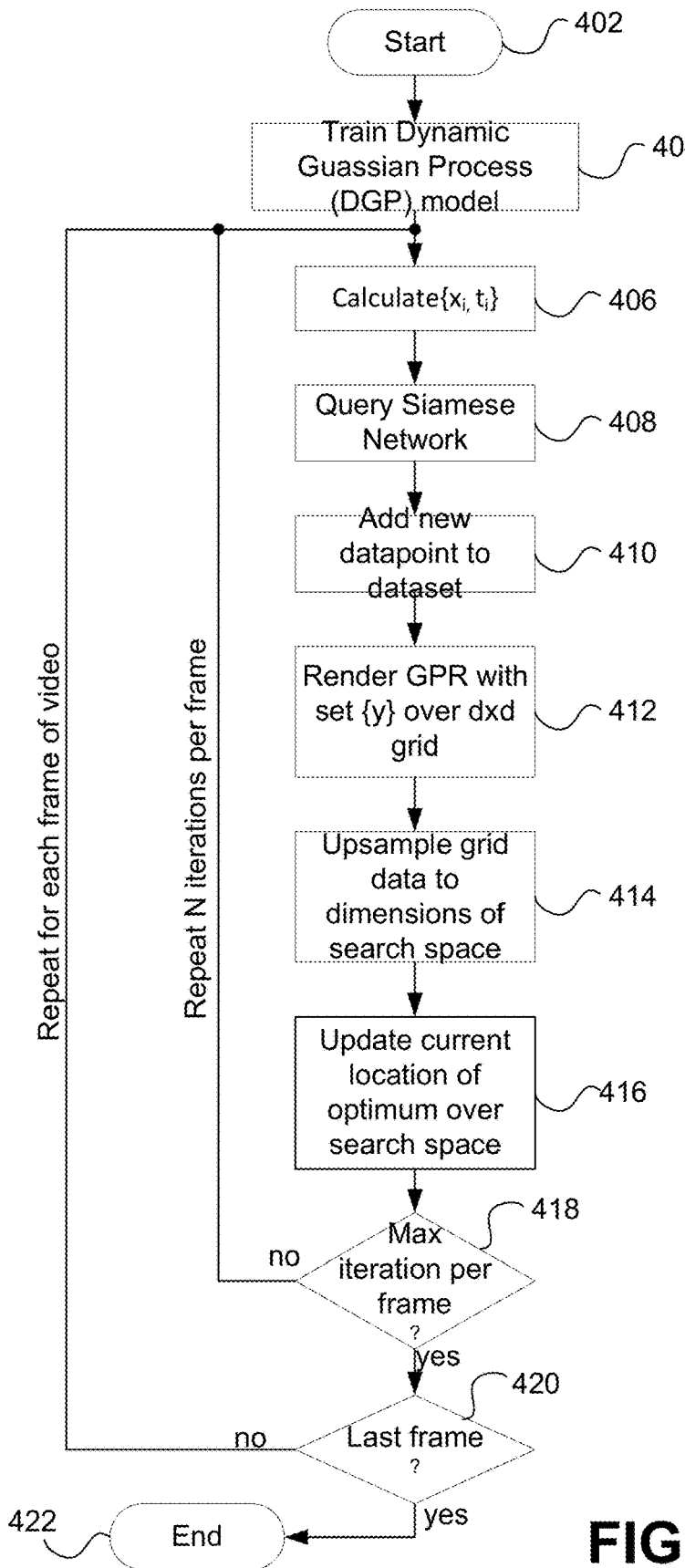
FIG. 4 is a flow diagram of an example method of Siamese-Dynamic Bayesian Tracking according to an embodiment.

FIG. 4 is a flow diagram of an example method 400 of the Siamese-Dynamic Bayesian Tracking Method (SDBTM) according to an embodiment. The method 400 may generally be implemented in a system such as, for example, the computer system 600 as described in FIG. 6. More particularly, the method 400 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, and fixed-functionality logic hardware using circuit technology such as, for example, ASIC, CMOS or TTL technology, or any combination thereof.

For example, computer program code to carry out operations shown in the method 400 may be written in any combination of one or more programming languages, including an object-oriented programming language such as JAVA, SMALLTALK, C++ or the like and conventional procedural programming languages, such as the "C" programming language or similar programming languages. Additionally, logic instructions might include assembler instruction, instruction set architecture (ISA) instructions, machine instruction, machine depended instruction, microcode, state setting data, configuration data for integrated circuitry, state information that personalizes electronic circuitry and/or other structural components that are native to hardware (e.g., host processor, central processing unit (CPU), microcontroller, etc.).

The process begins in block 402, where the process immediately proceeds to block 404. In block 404, a dynamic Gaussian Process (GP) model is trained. The hyper-parameters of the GP model are tuned using a small portion of the training data. This procedure makes certain that the hyper-parameters, which define the spatial scale of the model, are generally correct. For example, the GP has a parameter called scale factor. If the scale factor is set incorrectly, then the GP will make predictions that don't match well with the image scale. If the images are large, then the GP might be too refined or vice versa.

Once the dynamic GP model has been trained, each frame of the video must be analyzed to determine the location of the exemplar object Z to be tracked. The process then proceeds to block 406.

In block 406, for each frame of the video, the most likely location of the exemplar object Z must be found. We begin this process by using the acquisition function to indicate which candidate crop to select as the next sample. In other words, the acquisition function takes all of the pixels in a d×d search space and provides an approximate score for every location in the search space using acquisition function MS-EI. The higher the acquisition score, the more promising the location. Thus, the location with the highest acquisition score is selected as the next sample. The process then proceeds to block 408.

In block 408, a candidate crop X from the location with the highest acquisition score is passed through the Siamese network to obtain a similarity score f(x, t) indicating how similar the candidate crop X is to the exemplar crop Z. Again, a very high similarity score indicates a good match while a very low similarity score indicates a poor match. The process then proceeds to block 410.

In block 410, the coordinates and similarity scores for the candidate crop scored by the Siamese network are added to the dataset. The process then proceeds to block 412.

In block 412, the GPR approximation is rendered over the d×d search grid. Using a data set of crop centers x and f(x, t), the GP returns a mean µ(x) for the coordinate x and a standard deviation σ(x) for all points in the d×d grid. The acquisition function is used to compute MS-EI(x), which scores each coordinate in the d×d grid according to how promising it is to look at this point as the next sample. The higher the MS-EI score, the more promising the point. The process then proceeds to block 414.

In block 414, the d×d grid data is upsampled to the dimensions of search space S, where S is the version of the original search space. In one embodiment, S is the size of the original image. Thus, the d×d grid is approximated over the entire image. The process then proceeds to block 416.

In block 416, f(x*) is updated in the MS-EI equation. f(x*) represents the highest score assigned any crop by the Siamese network in the current frame. The process then proceeds to decision step 418.

In decision step 418, it is determined whether the maximum number of iterations per frame is reached. If the maximum number of iterations have been reached, the location of the exemplar crop Z in the current frame is represented the crop assigned the highest score by the Siamese network in the current frame. The maximum number of iterations per frame is pre-determined. The process then proceeds to decision block 420.

In decision block 420, it is determined whether there are additional frames in the video. If it is determined that there are additional frames in the video, the video advances to the next frame and the process returns to block 408 to begin determining the location of the exemplar crop Z in a new frame.

Returning to decision block 420, if it is determined that there are no more frames in the video, the process proceeds to block 422, where the process ends.

Returning to decision block 418, if it is determined that the maximum iterations per frame have not been reached, the process returns to block 406 to continue determining the location of the exemplar crop Z in the current frame.

Figure 5:
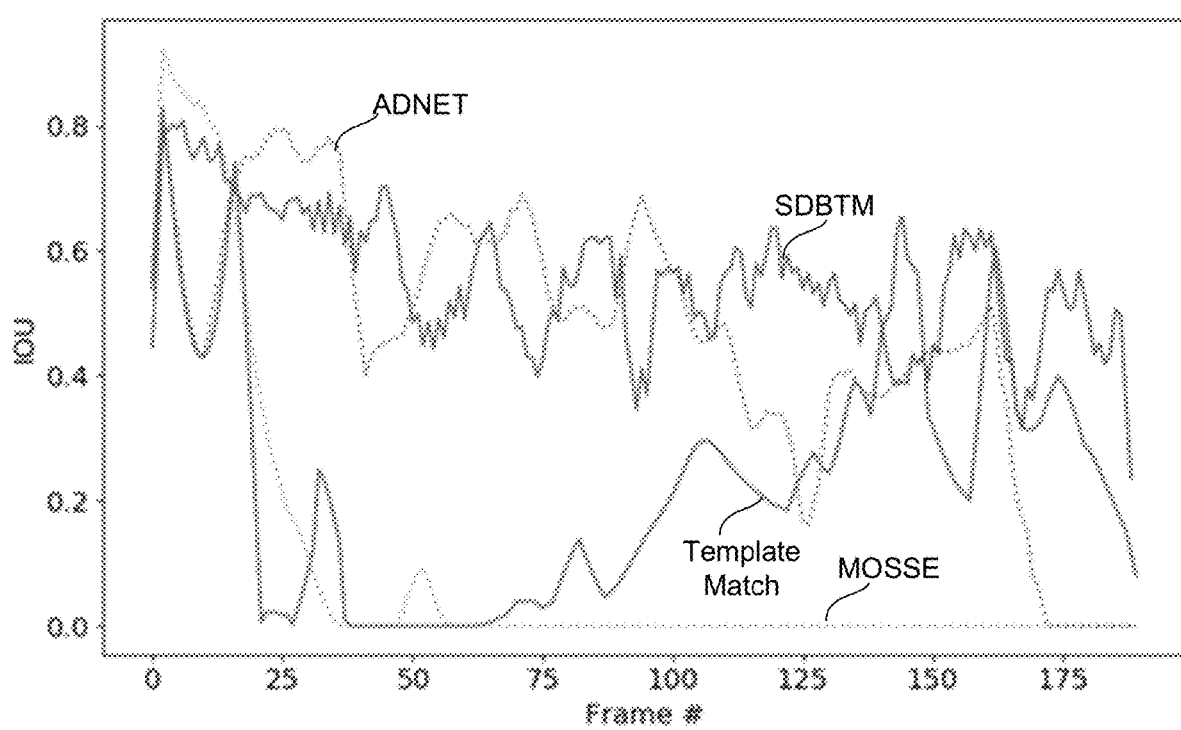
FIG. 5 is a diagram illustrating IOU results per frame for testing the performance of a Siamese-Dynamic Bayesian Tracking Model (SDBTM) against three baseline video tracking models.

FIG. 5 is a diagram 500 illustrating IOU results per frame for testing the performance of SDBTM against three baseline video tracking models. The three baseline video tracking models include template matching using normalized cross correlation (TM), the MOSSE tracker algorithm and ADNET (2017, CVPR), a state of the art, deep reinforcement learning-based video tracking algorithm. Each model was tested using the "CFNET" video tracking data set. The test video included 200 frames. As shown in diagram 500, the vertical axis corresponds to the IOU and the horizontal axis corresponds to the frame number of the video.

As shown in diagram 500, each of the comparison models suffered from either significant long-term tracking deterioration or episodic instability. For example, the MOSSE tracker fails to track after frame 30. The TM model fails to track from approximately frame 23 to frame 85, and the ADNET model fails to track after frame 170. The SDBTM used 80 samples per frame (cf. region proposal systems commonly rely on thousands of image queries). The SDBTM model, for the most part, exhibited general stability in tracking the 200 frames and showed strong quantitative tracking result, with a mean IOU of 0.56 and a standard deviation (std) IOU of 0.17. Table 1 shows the experimental results summary for the mean IOU and the standard deviation IOU for each model. The SDBTM model exhibited the best results summary with a mean IOU of 0.56 and a standard deviation IOU of 0.17. ADNET came in second place with a mean IOU of 0.47 and a standard deviation IOU of 0.23. MOSSE and TM showed lower mean IOU's and larger or approximately equivalent standard deviation IOU's.

TABLE 1

|  | TM | MOSSE | ADNET | SDBTM |
| --- | --- | --- | --- | --- |
| Mean IOU | 0.26 | 0.10 | 0.47 | 0.56 |
| Std IOU | 0.22 | 0.25 | 0.23 | 0.17 |

Figure 6:
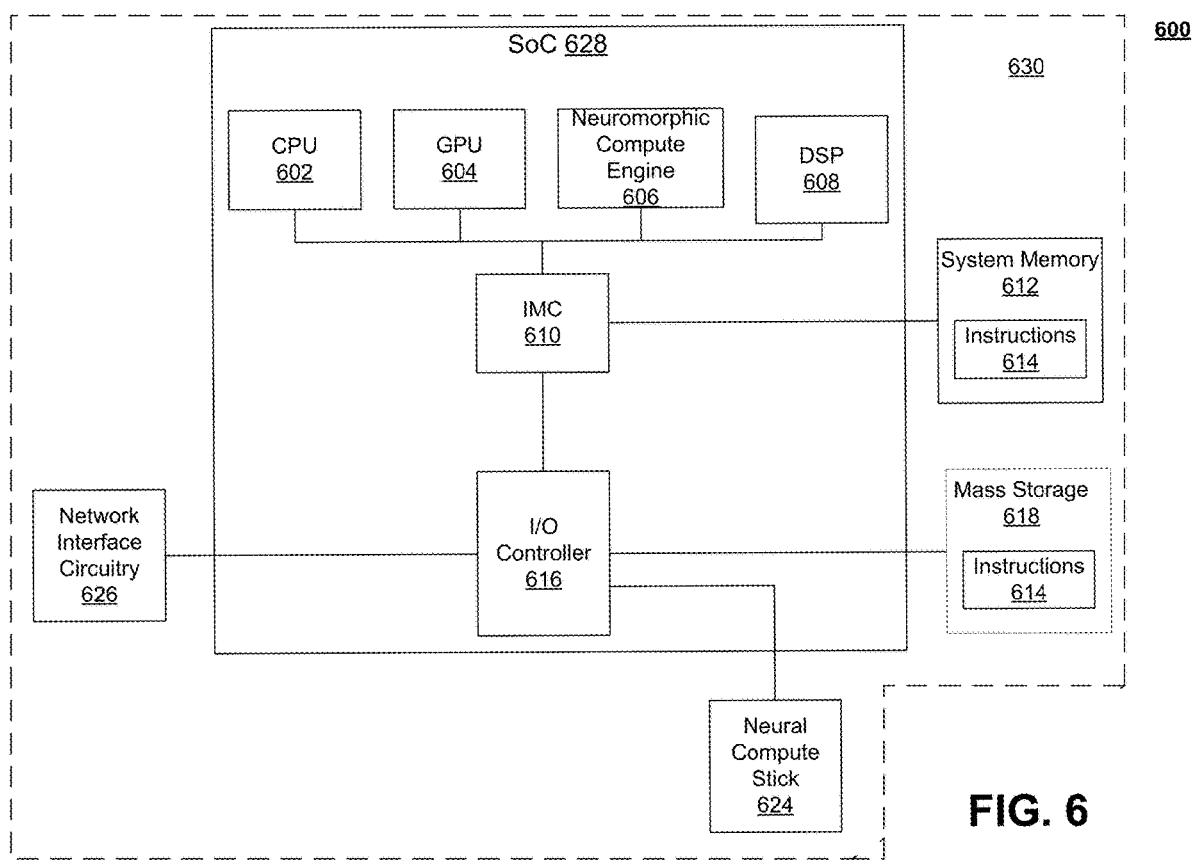
FIG. 6 is an exemplary block diagram of a computer system efficient video tracking with deep Siamese networks and Bayesian optimization according to an embodiment.

FIG. 6 is an exemplary block diagram of a computer system 600 for efficient video tracking with deep Siamese networks and Bayesian Optimization according to an embodiment. The computer system 600 includes multiprocessors such as a first processor 602 (e.g., host processor, central processing unit/CPU) and a second processor 604 (e.g., graphics processing unit/GPU). The first processor or CPU 602 is the central or main processor for carrying out instructions of computer programs, such as, for example, a method for efficient video tracking. The second processor or GPU 604 is primarily used to render 2-D and 3-D graphics, such as, for example, rendering the surrogate model using GPR. The GPU 604 may also be utilized to assist the CPU 602 in non-graphics computations. The CPU 602 and/or the GPU 604 may include a core region with one or more processor cores (not shown).

The computer system 600 also includes multiple compute engines to provide artificial machine intelligence. The compute engines include a neuromorphic compute engine 606 and a DSP (Digital signal processor) 608. The neuromorphic compute engine 606 is a hardware based accelerator used to increase the performance of deep neural networks. The neuromorphic compute engine 606 may be used to run neural networks, such as, for example, the Siamese neural network used to compare the similarity between an exemplar image/crop Z and a candidate image/crop X, as described above. The DSP 608 is an on-chip hardware block designed to run deep neural networks at high speed and low power without compromising accuracy. The DSP 608 may be used to accelerate deep learning inferences at the edge. Thus, the DSP 608 may be used for machine learning to train a Siamese network a similarity function used to differentiate between two objects/images and to provide a similarity score between two input images/crops in real-time.

The CPU 602, GPU 604, and the compute engines 606 and 608 are communicatively coupled to an integrated memory controller (IMC) 610. The IMC 610 is coupled to a system memory 612 (volatile memory, 3-D)(Point memory). The CPU 602, GPU 604, and the compute engines 606 and 608 may also be coupled to an input/output (I/O) module 616 that communicates with mass storage 618 (e.g., non-volatile memory/NVM, hard disk drive/HDD, optical disk, solid state disk/SSD, flash memory), one or more neural compute sticks (NCS) 624, such as, for example, the Intel® Movidius™ NCS (a USB-based deep learning/self-contained device used for artificial intelligence (AI) programming at the edge), and network interface circuitry 626 (e.g., network controller, network interface card/NIC).

The one or more NCS(s) 624 may provide dedicated deep neural network capabilities to the multiprocessors (602 and 604) and the compute engines (606 and 608) at the edge. Each of the one or more NCS(s) 624 include a VPU (Vision Processing Unit) to run real-time deep neural networks directly from the device to deliver dedicated high-performance processing in a small form factor. In embodiments, the one or more NCS(s) 624 may be used to perform a similarity function that yields a similarity score between an exemplar object/crop Z and a candidate object/crop X.

The network interface circuitry 626 may provide off platform communication functionality for a wide variety of purposes, such as, for example, cellular telephone (e.g., Wideband Code Division Multiple Access/W-CDMA (Universal Mobile Telecommunications System/UMTS), CDMA2000 (IS-856/IS-2000), etc.), Wi-Fi (wireless Fidelity, e.g., Institute of Electrical and Electronics Engineers/IEEE 802.11-2007, Wireless Local Area Network/LAN Medium Access Control (MAC) and physical layer (PHY) specifications, 4G LTE (Fourth Generation Long Term Evolution), Bluetooth, WiMAX (e.g., IEEE 802.16-2004, LAN/MAN Broadband Wireless LANS), Global Positioning System (GPS), spread spectrum (e.g., 900 MHz), and other radio frequency (RF) telephony purposes. Other standards and/or technologies may also be implemented in the network interface circuitry 626. In one embodiment, the network interface circuitry 626 may enable communication with various cloud services to perform AI tasks in the cloud.

Although the CPU 602, the GPU 604, the compute engines 606 and 608, the IMC 610, and the I/O controller 616 are illustrated as separate blocks, these components may be implemented as a system on chip (SOC) 628 on the same semiconductor die.

The system memory 612 and/or the mass memory 618 may be memory devices that store instructions 614, which when executed by the processors 602 and/or 604 or the compute engines 606 and/or 608, cause the computer system 600 to perform one or more aspects of methods 120, 200, 300 and 400 for efficient video tracking with deep Siamese networks and Bayesian optimization, described above with reference to FIGS. 1B, 2A, 3A and 4. Thus, execution of the instructions 614 may cause the computer system 600 to integrate deep learning with Bayesian optimization to perform efficient video tracking.

Figure 7:
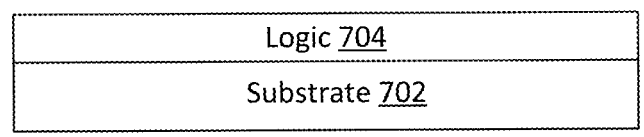
FIG. 7 is an illustration of an example of a semiconductor package apparatus according to an embodiment.

FIG. 7 shows a semiconductor package apparatus 700 (e.g., chip) that includes a substrate 702 (e.g., silicon, sapphire, gallium arsenide) and logic 704 (e.g., transistor array and other integrated circuit/IC components) coupled to the substrate 702. The logic 704, which may be implemented in configurable logic and/or fixed-functionality logic hardware, may generally implement one or more aspects of the methods 120, 200, 300 and 400 (FIGS. 1B, 2A, 3A and 4), already discussed.

Figure 8:
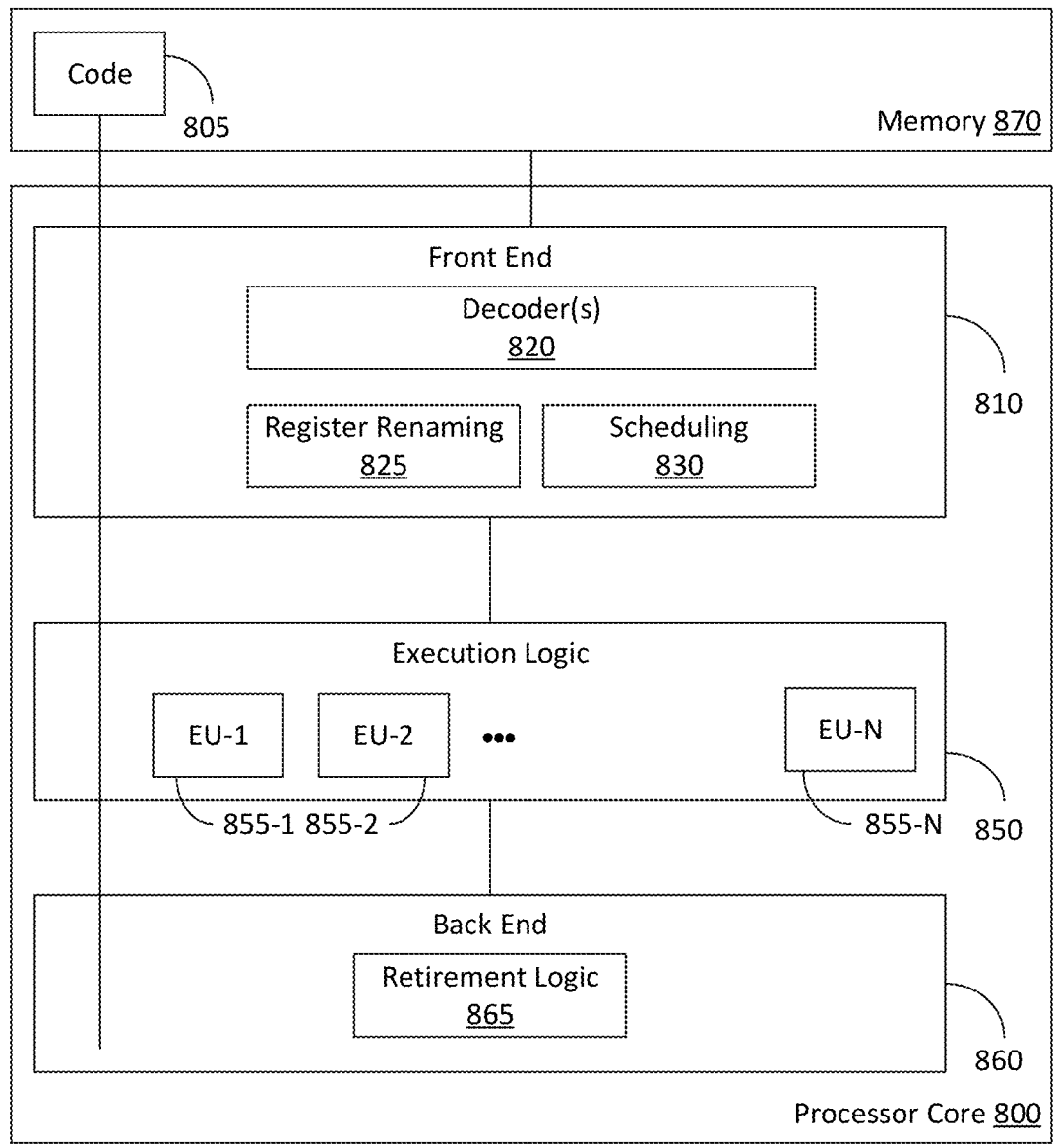
FIG. 8 is a block diagram of an exemplary processor according to an embodiment.

FIG. 8 illustrates a processor core 800 according to one embodiment. The processor core 800 may be the core for any type of processor, such as a micro-processor, an embedded processor, a digital signal processor (DSP), a network processor, or other device to execute code. Although only one processor core 800 is illustrated in FIG. 8, a processing element may alternatively include more than one of the processor core 800 illustrated in FIG. 8. The processor core 800 may be a single-threaded core or, for at least one embodiment, the processor core 800 may be multithreaded in that it may include more than one hardware thread context (or "logical processor") per core.

FIG. 8 also illustrates a memory 870 coupled to the processor core 800. The memory 870 may be any of a wide variety of memories (including various layers of memory hierarchy) as are known or otherwise available to those of skill in the art. The memory 870 may include one or more code 805 instruction(s) to be executed by the processor core 800, wherein the code 805 may implement the methods 120, 200, 300 and 400 (FIGS. 1B, 2A, 3A and 4), already discussed. The processor core 800 follows a program sequence of instructions indicated by the code 805. Each instruction may enter a front end portion 810 and be processed by one or more decoders 820. The decoder 820 may generate as its output a micro operation such as a fixed width micro operation in a predefined format, or may generate other instructions, microinstructions, or control signals which reflect the original code instruction. The illustrated front end portion 810 also includes register renaming logic 825 and scheduling logic 830, which generally allocate resources and queue the operation corresponding to the convert instruction for execution.

The processor core 800 is shown including execution logic 850 having a set of execution units 855-1 through 855-N. Some embodiments may include a number of execution units dedicated to specific functions or sets of functions. Other embodiments may include only one execution unit or one execution unit that can perform a particular function. The illustrated execution logic 850 performs the operations specified by code instructions.

After completion of execution of the operations specified by the code instructions, back end logic 860 retires the instructions of the code 805. In one embodiment, the processor core 800 allows out of order execution but requires in order retirement of instructions. Retirement logic 865 may take a variety of forms as known to those of skill in the art (e.g., re-order buffers or the like). In this manner, the processor core 800 is transformed during execution of the code 805, at least in terms of the output generated by the decoder, the hardware registers and tables utilized by the register renaming logic 825, and any registers (not shown) modified by the execution logic 850.

Although not illustrated in FIG. 8, a processing element may include other elements on chip with the processor core 800. For example, a processing element may include memory control logic along with the processor core 800. The processing element may include I/O control logic and/or may include I/O control logic integrated with memory control logic. The processing element may also include one or more caches.

Referring now to FIG. 9, shown is a block diagram of a computing system 900 in accordance with an embodiment. Shown in FIG. 9 is a multiprocessor system 900 that includes a first processing element 970 and a second processing element 980. While two processing elements 970 and 980 are shown, it is to be understood that an embodiment of the system 900 may also include only one such processing element.

The system 900 is illustrated as a point-to-point interconnect system, wherein the first processing element 970 and the second processing element 980 are coupled via a point-to-point interconnect 950. It should be understood that any or all of the interconnects illustrated in FIG. 9 may be implemented as a multi-drop bus rather than point-to-point interconnect.

As shown in FIG. 9, each of processing elements 970 and 980 may be multicore processors, including first and second processor cores (i.e., processor cores 974a and 974b and processor cores 984a and 984b). Such cores 974a, 974b, 984a, 984b may be configured to execute instruction code in a manner similar to that discussed above in connection with FIG. 8.

Each processing element 970, 980 may include at least one shared cache 996a, 996b. The shared cache 996a, 996b may store data (e.g., instructions) that are utilized by one or more components of the processor, such as the cores 974a, 974b and 984a, 984b, respectively. For example, the shared cache 996a, 996b may locally cache data stored in a memory 932, 934 for faster access by components of the processor. In one or more embodiments, the shared cache 996a, 996b may include one or more mid-level caches, such as level 2 (L2), level 3 (L3), level 4 (L4), or other levels of cache, a last level cache (LLC), and/or combinations thereof.

While shown with only two processing elements 970, 980, it is to be understood that the scope of the embodiments are not so limited. In other embodiments, one or more additional processing elements may be present in a given processor. Alternatively, one or more of processing elements 970, 980 may be an element other than a processor, such as an accelerator or a field programmable gate array. For example, additional processing element(s) may include additional processors(s) that are the same as a first processor 970, additional processor(s) that are heterogeneous or asymmetric to processor a first processor 970, accelerators (such as, e.g., graphics accelerators or digital signal processing (DSP) units), field programmable gate arrays, or any other processing element. There can be a variety of differences between the processing elements 970, 980 in terms of a spectrum of metrics of merit including architectural, micro architectural, thermal, power consumption characteristics, and the like. These differences may effectively manifest themselves as asymmetry and heterogeneity amongst the processing elements 970, 980. For at least one embodiment, the various processing elements 970, 980 may reside in the same die package.

The first processing element 970 may further include memory controller logic (MC) 972 and point-to-point (P-P) interfaces 976 and 978. Similarly, the second processing element 980 may include a MC 982 and P-P interfaces 986 and 988. As shown in FIG. 9, MC's 972 and 982 couple the processors to respective memories, namely a memory 932 and a memory 934, which may be portions of main memory locally attached to the respective processors. While the MC 972 and 982 is illustrated as integrated into the processing elements 970, 980, for alternative embodiments the MC logic may be discrete logic outside the processing elements 970, 980 rather than integrated therein.

The first processing element 970 and the second processing element 980 may be coupled to an I/O subsystem 990 via P-P interconnects 976 986, respectively. As shown in FIG. 9, the I/O subsystem 990 includes P-P interfaces 994 and 998. Furthermore, I/O subsystem 990 includes an interface 992 to couple I/O subsystem 990 with a high-performance graphics engine 938. In one embodiment, bus 949 may be used to couple the graphics engine 938 to the I/O subsystem 990. Alternately, a point-to-point interconnect may couple these components.

In turn, I/O subsystem 990 may be coupled to a first bus 916 via an interface 996. In one embodiment, the first bus 916 may be a Peripheral Component Interconnect (PCI) bus, or a bus such as a PCI Express bus or another third generation I/O interconnect bus, although the scope of the embodiments is not so limited.

As shown in FIG. 9, various I/O devices 914 (e.g., biometric scanners, speakers, cameras, sensors) may be coupled to the first bus 916, along with a bus bridge 918 which may couple the first bus 916 to a second bus 920. In one embodiment, the second bus 920 may be a low pin count (LPC) bus. Various devices may be coupled to the second bus 920 including, for example, a keyboard/mouse 912, communication device(s) 926, and a data storage unit 919 such as a disk drive or other mass storage device which may include code 930, in one embodiment. The illustrated code 930 may implement the methods 120, 200, 300 and 400 (FIGS. 1B, 2A, 3A and 4), already discussed, and may be similar to the code 805 (FIG. 8), already discussed. Further, an audio I/O 924 may be coupled to second bus 920 and a battery 910 may supply power to the computing system 900.

Note that other embodiments are contemplated. For example, instead of the point-to-point architecture of FIG. 9, a system may implement a multi-drop bus or another such communication topology. Also, the elements of FIG. 9 may alternatively be partitioned using more or fewer integrated chips than shown in FIG. 9.

ADDITIONAL NOTES AND EXAMPLES

Example 1 includes at least one computer readable medium, comprising a set of instructions, which when executed by one or more computing devices, cause the one or more computing devices to select an exemplar crop to be tracked in an initial frame of a video, apply Bayesian optimization with each subsequent frame of the video to build a surrogate model of an objective function using Gaussian Process Regression (GPR) based on similarity scores of candidate crops collected from a search space in a current frame of the video, and determine where to proficiently obtain a next candidate crop in the search space using an acquisition function, compare the next candidate crop to the exemplar crop using a Siamese neural network, and continue comparison of a new candidate crop to the exemplar crop using the Siamese neural network until the exemplar crop has been found in the current frame, wherein the new candidate crop is selected based on an updated surrogate model.

Example 2 includes the at least one computer readable medium of example 1, wherein instructions to build a surrogate model of the objective function further comprises instructions, which when executed by the one or more computing devices, cause the one or more computing devices to obtain candidate crops of an image in the search space of the current frame of the video, obtain a similarity score for each of the candidate crops by passing each of the candidate crops through the Siamese neural network, and draw a graph over the image using each similarity score from each of the candidate crops to interpolate similarity scores of locations in the frame that have not yet been sampled.

Example 3 includes the at least one computer readable medium of example 1, wherein instructions to determine where to proficiently obtain the next candidate crop in the search space using the acquisition function further comprises instructions, which when executed by the one or more computing devices, cause the one or more computing devices to apply the acquisition function to each of the candidate crops in the search space to obtain an approximation of a similarity score for the candidate crops as if each of the candidate crops had been passed through a Siamese network without passing the candidate crops through the Siamese network, and select a candidate crop from the search space that has a maximum acquisition function result as the next candidate crop.

Example 4 includes the at least one computer readable medium of example 1, wherein the acquisition function comprises a memory-score expected-improvement (MS-EI) acquisition function.

Example 5 includes the at least one computer readable medium of example 1, wherein instructions to compare the next candidate crop to the exemplar object further comprises instructions, which when executed by the one or more computing devices, cause the one or more computing devices to pass the next candidate crop through the Siamese network to obtain a similarity score, update the surrogate model with the new similarity score, and find a maximum point on the updated surrogate model to use as the new candidate crop.

Example 6 includes the at least one computer readable medium of example 1, wherein the surrogate model formulates a graph of hills and valleys representative of a location of a tracked object in each frame of the video.

Example 7 includes the at least one computer readable medium of example 1, wherein the Siamese neural network is trained as a general object similarity function.

Example 8 includes the at least one computer readable medium of example 1, wherein the search space comprises a d×d grid, and wherein the surrogate model is rendered over the d×d grid.

Example 9 includes the at least one computer readable medium of example 1, wherein instructions to continue comparison of the new candidate crop to the exemplar crop using the Siamese neural network until the exemplar crop has been found in the current frame further comprises instructions, which when executed by the one or more computing devices, cause the one or more computing devices to compare N new candidate crops to the exemplar crop using the Siamese neural network and select the new candidate crop with the highest similarity score as the exemplar crop in the frame.

Example 10 includes the at least one computer readable medium of example 1, wherein instructions to continue comparison of the new candidate crop to the exemplar crop using the Siamese neural network until the exemplar crop has been found in the current frame further comprises instructions, which when executed by the one or more computing devices, cause the one or more computing devices to continue comparison of the new candidate crop to the exemplar crop using the Siamese neural network until a confidence level in the similarity score of a current new candidate crop is sufficiently high to indicate that the exemplar crop has been found.

Example 11 includes a semiconductor package apparatus comprising one or more substrates, and logic coupled to the one or more substrates, wherein the logic includes one or more of configurable logic or fixed-functionality hardware logic, the logic coupled to the one or more substrates to select an exemplar crop to be tracked in an initial frame of a video, apply Bayesian optimization with each subsequent frame of the video to build a surrogate model of an objective function using Gaussian Process Regression (GPR) based on similarity scores of candidate crops collected from a search space in a current frame of the video, and determine where to proficiently obtain a next candidate crop in the search space using an acquisition function, compare the next candidate crop to the exemplar crop using a Siamese neural network, and continue comparison of a new candidate crop to the exemplar crop using the Siamese neural network until the exemplar crop has been found in the current frame, wherein the new candidate crop is selected based on an updated surrogate model.

Example 12 includes the semiconductor package apparatus of example 11, wherein logic to build a surrogate model of the objective function further includes logic coupled to the substrate to obtain candidate crops of an image in the search space of the current frame of the video, obtain a similarity score for each of the candidate crops by passing each of the candidate crops through the Siamese neural network, and draw a graph over the image using each similarity score from each of the candidate crops to interpolate similarity scores of locations in the frame that have not yet been sampled.

Example 13 includes the semiconductor package apparatus of example 11, wherein logic to determine where to proficiently obtain the next candidate crop in the search space using the acquisition function further includes logic coupled to the substrate to apply the acquisition function to each of the candidate crops in the search space to obtain an approximation of a similarity score for the candidate crops as if each of the candidate crops had been passed through a Siamese network without passing the candidate crops through the Siamese network, and select a candidate crop from the search space that has a maximum acquisition function result as the next candidate crop.

Example 14 includes the semiconductor package apparatus of example 11, wherein the acquisition function comprises a memory-score expected-improvement (MS-EI) acquisition function.

Example 15 includes the semiconductor package apparatus of example 11, wherein logic to compare the next candidate crop to the exemplar object further includes logic coupled to the substrate to pass the next candidate crop through the Siamese network to obtain a similarity score, update the surrogate model with the new similarity score, and find a maximum point on the updated surrogate model to use as the new candidate crop.

Example 16 includes the semiconductor package apparatus of example 11, wherein the surrogate model formulates a graph of hills and valleys representative of a location of a tracked object in each frame of the video.

Example 17 includes the semiconductor package apparatus of example 11, wherein the Siamese neural network is trained as a general object similarity function.

Example 18 includes the semiconductor package apparatus of example 11, wherein the search space comprises a d×d grid, and wherein the surrogate model is rendered over the d×d grid.

Example 19 includes the semiconductor package apparatus of example 11, wherein logic to continue comparison of the new candidate crop to the exemplar crop using the Siamese neural network until the exemplar crop has been found in the current frame further includes logic coupled to the substrate to compare N new candidate crops to the exemplar crop using the Siamese neural network and select the new candidate crop with the highest similarity score as the exemplar crop in the frame.

Example 20 includes the semiconductor package apparatus of example 11, wherein logic to continue comparison of the new candidate crop to the exemplar crop using the Siamese neural network until the exemplar crop has been found in the current frame further includes logic coupled to the substrate to continue comparison of the new candidate crop to the exemplar crop using the Siamese neural network until a confidence level in the similarity score of a current new candidate crop is sufficiently high to indicate that the exemplar crop has been found.

Example 21 includes a method of video tracking comprising selecting an exemplar crop to be tracked in an initial frame of a video, applying Bayesian optimization with each subsequent frame of the video by building a surrogate model of an objective function using Gaussian Process Regression (GPR) based on similarity scores of candidate crops collected from a search space in a current frame of the video, and determining where to proficiently obtain a next candidate crop in the search space using an acquisition function, comparing the next candidate crop to the exemplar crop using a Siamese neural network, and continuing comparison of a new candidate crop to the exemplar crop using the Siamese neural network until the exemplar crop has been found in the current frame, wherein the new candidate crop is selected based on an updated surrogate model.

Example 22 includes the method of example 21, wherein building a surrogate model of the objective function comprises obtaining candidate crops of an image in the search space of the current frame of the video, obtaining a similarity score for each of the candidate crops by passing each of the candidate crops through the Siamese neural network, and drawing a graph over the image using each similarity score from each of the candidate crops to interpolate similarity scores of locations in the frame that have not yet been sampled.

Example 23 includes the method of example 21, wherein determining where to proficiently obtain the next candidate crop in the search space using the acquisition function comprises applying the acquisition function to each of the candidate crops in the search space to obtain an approximation of a similarity score for the candidate crops as if each of the candidate crops had been passed through a Siamese network without passing the candidate crops through the Siamese network, and selecting a candidate crop from the search space that has a maximum acquisition function result as the next candidate crop.

Example 24 includes the method of example 21, wherein the acquisition function comprises a memory-score expected-improvement (MS-EI) acquisition function.

Example 25 includes the method of example 21, wherein comparing the next candidate crop to the exemplar object comprises passing the next candidate crop through the Siamese network to obtain a similarity score, updating the surrogate model with the new similarity score, and finding a maximum point on the updated surrogate model to use as the new candidate crop.

Example 26 includes the method of example 21, wherein the surrogate model formulates a graph of hills and valleys representative of a location of a tracked object in each frame of the video.

Example 27 includes the method of example 21, wherein the Siamese neural network is trained as a general object similarity function.

Example 28 includes the method of example 21, wherein the search space comprises a d×d grid, wherein the surrogate model is rendered over the d×d grid.

Example 29 includes the method of example 21, wherein continuing comparison of the new candidate crop to the exemplar crop using the Siamese neural network until the exemplar crop has been found in the current frame comprises comparing N new candidate crops to the exemplar crop using the Siamese neural network and selecting the new candidate crop with the highest similarity score as the exemplar crop in the frame.

Example 30 includes the method of example 21, wherein continuing comparison of the new candidate crop to the exemplar crop using the Siamese neural network until the exemplar crop has been found in the current frame comprises continuing comparison of the new candidate crop to the exemplar crop using the Siamese neural network until a confidence level in the similarity score of a current new candidate crop is sufficiently high to indicate that the exemplar crop has been found.

Example 31 includes a computer system for video tracking comprising one or more processors, one or more memory devices coupled to the one or more processors, the one or more memory devices including instructions, which when executed by the one or more processors, cause the computer system to select an exemplar crop to be tracked in an initial frame of a video, apply Bayesian optimization with each subsequent frame of the video to build a surrogate model of an objective function using Gaussian Process Regression (GPR) based on similarity scores of candidate crops collected from a search space in a current frame of the video, and determine where to proficiently obtain a next candidate crop in the search space using an acquisition function, compare the next candidate crop to the exemplar crop using a Siamese neural network, and continue comparison of a new candidate crop to the exemplar crop using the Siamese neural network until the exemplar crop has been found in the current frame, wherein the new candidate crop is selected based on an updated surrogate model.

Example 32 includes the computer system of example 31, wherein instructions to build a surrogate model of the objective function further comprises instructions, which when executed by the one or more processors, cause the computer system to obtain candidate crops of an image in the search space of the current frame of the video, obtain a similarity score for each of the candidate crops by passing each of the candidate crops through the Siamese neural network, and draw a graph over the image using each similarity score from each of the candidate crops to interpolate similarity scores of locations in the frame that have not yet been sampled.

Example 33 includes the computer system of example 31, wherein instructions to determine where to proficiently obtain the next candidate crop in the search space using the acquisition function further comprises instructions, which when executed by the one or more processors, cause the computer system to apply the acquisition function to each of the candidate crops in the search space to obtain an approximation of a similarity score for the candidate crops as if each of the candidate crops had been passed through a Siamese network without passing the candidate crops through the Siamese network, and select a candidate crop from the search space that has a maximum acquisition function result as the next candidate crop.

Example 34 includes the computer system of example 31, wherein the acquisition function comprises a memory-score expected-improvement (MS-EI) acquisition function.

Example 35 includes the computer system of example 31, wherein instructions to compare the next candidate crop to the exemplar object further comprises instructions, which when executed by the one or more processors, cause the computing system to pass the next candidate crop through the Siamese network to obtain a similarity score, update the surrogate model with the new similarity score, and find a maximum point on the updated surrogate model to use as the new candidate crop.

Example 36 includes the computer system of example 31, wherein the surrogate model formulates a graph of hills and valleys representative of a location of a tracked object in each frame of the video.

Example 37 includes the computer system of example 31, wherein the Siamese neural network is trained as a general object similarity function.

Example 38 includes the computer system of example 31, wherein the search space comprises a d×d grid, and wherein the surrogate model is rendered over the d×d grid.

Example 39 includes the computer system of example 31, wherein instructions to continue comparison of the new candidate crop to the exemplar crop using the Siamese neural network until the exemplar crop has been found in the current frame further comprises instructions, which when executed by the one or more processors, cause the computer system to compare N new candidate crops to the exemplar crop using the Siamese neural network and select the new candidate crop with the highest similarity score as the exemplar crop in the frame.

Example 40 includes the computer system of example 31, wherein instructions to continue comparison of the new candidate crop to the exemplar crop using the Siamese neural network until the exemplar crop has been found in the current frame further comprises instructions, which when executed by the one or more processors, cause the computer system to continue comparison of the new candidate crop to the exemplar crop using the Siamese neural network until a confidence level in the similarity score of a current new candidate crop is sufficiently high to indicate that the exemplar crop has been found.

Example 41 includes an apparatus for video tracking comprising means for selecting an exemplar crop to be tracked in an initial frame of a video, means for applying Bayesian optimization with each subsequent frame of the video by means for building a surrogate model of an objective function using Gaussian Process Regression (GPR) based on similarity scores of candidate crops collected from a search space in a current frame of the video, and means for determining where to proficiently obtain a next candidate crop in the search space using an acquisition function, means for comparing the next candidate crop to the exemplar crop using a Siamese neural network, and means for continuing comparison of a new candidate crop to the exemplar crop using the Siamese neural network until the exemplar crop has been found in the current frame, wherein the new candidate crop is selected based on an updated surrogate model.

Example 42 includes the apparatus of example 41, wherein means for building a surrogate model of the objective function comprises means for obtaining candidate crops of an image in the search space of the current frame of the video, means for obtaining a similarity score for each of the candidate crops by passing each of the candidate crops through the Siamese neural network, and means for drawing a graph over the image using each similarity score from each of the candidate crops to interpolate similarity scores of locations in the frame that have not yet been sampled.

Example 43 includes the apparatus of example 41, wherein means for determining where to proficiently obtain the next candidate crop in the search space using the acquisition function comprises means for applying the acquisition function to each of the candidate crops in the search space to obtain an approximation of a similarity score for the candidate crops as if each of the candidate crops had been passed through a Siamese network without passing the candidate crops through the Siamese network, and means for selecting a candidate crop from the search space that has a maximum acquisition function result as the next candidate crop.

Example 44 includes the apparatus of example 41, wherein the acquisition function comprises a memory-score expected-improvement (MS-EI) acquisition function.

Example 45 includes the apparatus of example 41, wherein means for comparing the next candidate crop to the exemplar object comprises means for passing the next candidate crop through the Siamese network to obtain a similarity score, means for updating the surrogate model with the new similarity score, and means for finding a maximum point on the updated surrogate model to use as the new candidate crop.

Example 46 includes the apparatus of example 41, wherein the surrogate model formulates a graph of hills and valleys representative of a location of a tracked object in each frame of the video.

Example 47 includes the apparatus of example 41, wherein the Siamese neural network is trained as a general object similarity function.

Example 48 includes the apparatus of example 41, wherein the search space comprises a d×d grid, wherein the surrogate model is rendered over the d×d grid.

Example 49 includes the apparatus of example 41, wherein means for continuing comparison of the new candidate crop to the exemplar crop using the Siamese neural network until the exemplar crop has been found in the current frame further comprises means for comparing N new candidate crops to the exemplar crop using the Siamese neural network and selecting the new candidate crop with the highest similarity score as the exemplar crop in the frame.

Example 50 includes the apparatus of example 41, wherein means for continuing comparison of the new candidate crop to the exemplar crop using the Siamese neural network until the exemplar crop has been found in the current frame further comprises means for continuing comparison of the new candidate crop to the exemplar crop using the Siamese neural network until a confidence level in the similarity score of a current new candidate crop is sufficiently high to indicate that the exemplar crop has been found.

Example 51 includes at least one computer readable medium comprising a set of instructions, which when executed by a computing system, cause the computing system to perform the method of any one of examples 21 to 30.

Example 52 includes an apparatus comprising means for performing the method of any one of examples 21 to 30.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. At least one non-transitory computer readable medium, comprising a set of instructions, which when executed by one or more computing devices, cause the one or more computing devices to:
   select an exemplar crop to be tracked in an initial frame of a video;
   apply Bayesian optimization with each subsequent frame of the video to:
      build a surrogate model of an objective function using Gaussian Process Regression (GPR) based on similarity scores of candidate crops collected from a search space in a current frame of the video; and
      determine where to proficiently obtain a next candidate crop in the search space using an acquisition function;
   compare the next candidate crop to the exemplar crop using a Siamese neural network; and
   continue comparison of a new candidate crop to the exemplar crop using the Siamese neural network until the exemplar crop has been found in the current frame, wherein the new candidate crop is selected based on an updated surrogate model.

2. The at least one non-transitory computer readable medium of claim 1, wherein instructions to build a surrogate model of the objective function further comprises instructions, which when executed by the one or more computing devices, cause the one or more computing devices to:
   obtain candidate crops of an image in the search space of the current frame of the video;
   obtain a similarity score for each of the candidate crops by passing each of the candidate crops through the Siamese neural network; and
   draw a graph over the image using each similarity score from each of the candidate crops to interpolate similarity scores of locations in the frame that have not yet been sampled.

3. The at least one non-transitory computer readable medium of claim 1, wherein instructions to determine where to proficiently obtain the next candidate crop in the search space using the acquisition function further comprises instructions, which when executed by the one or more computing devices, cause the one or more computing devices to:
   apply the acquisition function to each of the candidate crops in the search space to obtain an approximation of a similarity score for the candidate crops as if each of the candidate crops had been passed through a Siamese network without passing the candidate crops through the Siamese network; and
   select a candidate crop from the search space that has a maximum acquisition function result as the next candidate crop.

4. The at least one non-transitory computer readable medium of claim 1, wherein the acquisition function comprises a memory-score expected-improvement (MS-EI) acquisition function.

5. The at least one non-transitory computer readable medium of claim 1, wherein instructions to compare the next candidate crop to the exemplar object further comprises instructions, which when executed by the one or more computing devices, cause the one or more computing devices to:
   pass the next candidate crop through the Siamese network to obtain a similarity score;
   update the surrogate model with the new similarity score; and
   find a maximum point on the updated surrogate model to use as the new candidate crop.

6. The at least one non-transitory computer readable medium of claim 1, wherein the surrogate model formulates a graph of hills and valleys representative of a location of a tracked object in each frame of the video.

7. The at least one non-transitory computer readable medium of claim 1, wherein the Siamese neural network is trained as a general object similarity function.

8. The at least one non-transitory computer readable medium of claim 1, wherein the search space comprises a d×d grid, and wherein the surrogate model is rendered over the d×d grid.

9. The at least one non-transitory computer readable medium of claim 1, wherein instructions to continue comparison of the new candidate crop to the exemplar crop using the Siamese neural network until the exemplar crop has been found in the current frame further comprises instructions, which when executed by the one or more computing devices, cause the one or more computing devices to compare N new candidate crops to the exemplar crop using the Siamese neural network and select the new candidate crop with the highest similarity score as the exemplar crop in the frame.

10. The at least one non-transitory computer readable medium of claim 1, wherein instructions to continue comparison of the new candidate crop to the exemplar crop using the Siamese neural network until the exemplar crop has been found in the current frame further comprises instructions, which when executed by the one or more computing devices, cause the one or more computing devices to continue comparison of the new candidate crop to the exemplar crop using the Siamese neural network until a confidence level in the similarity score of a current new candidate crop is sufficiently high to indicate that the exemplar crop has been found.

11. A semiconductor package apparatus comprising:
one or more substrates; and
logic coupled to the one or more substrates, wherein the logic includes one or more of configurable logic or fixed-functionality hardware logic, the logic coupled to the one or more substrates to:
select an exemplar crop to be tracked in an initial frame of a video;
apply Bayesian optimization with each subsequent frame of the video to:
build a surrogate model of an objective function using Gaussian Process Regression (GPR) based on similarity scores of candidate crops collected from a search space in a current frame of the video; and
determine where to proficiently obtain a next candidate crop in the search space using an acquisition function;
compare the next candidate crop to the exemplar crop using a Siamese neural network; and
continue comparison of a new candidate crop to the exemplar crop using the Siamese neural network until the exemplar crop has been found in the current frame, wherein the new candidate crop is selected based on an updated surrogate model.

12. The semiconductor package apparatus of claim 11, wherein logic to build a surrogate model of the objective function further includes logic coupled to the substrate to:
obtain candidate crops of an image in the search space of the current frame of the video;
obtain a similarity score for each of the candidate crops by passing each of the candidate crops through the Siamese neural network; and
draw a graph over the image using each similarity score from each of the candidate crops to interpolate similarity scores of locations in the frame that have not yet been sampled.

13. The semiconductor package apparatus of claim 11, wherein logic to determine where to proficiently obtain the next candidate crop in the search space using the acquisition function further includes logic coupled to the substrate to:
apply the acquisition function to each of the candidate crops in the search space to obtain an approximation of a similarity score for the candidate crops as if each of the candidate crops had been passed through a Siamese network without passing the candidate crops through the Siamese network; and
select a candidate crop from the search space that has a maximum acquisition function result as the next candidate crop.

14. The semiconductor package apparatus of claim 11, wherein the acquisition function comprises a memory-score expected-improvement (MS-EI) acquisition function.

15. The semiconductor package apparatus of claim 11, wherein logic to compare the next candidate crop to the exemplar object further includes logic coupled to the substrate to:
pass the next candidate crop through the Siamese network to obtain a similarity score;
update the surrogate model with the new similarity score; and
find a maximum point on the updated surrogate model to use as the new candidate crop.

16. The semiconductor package apparatus of claim 11, wherein the surrogate model formulates a graph of hills and valleys representative of a location of a tracked object in each frame of the video.

17. The semiconductor package apparatus of claim 11, wherein the Siamese neural network is trained as a general object similarity function.

18. The semiconductor package apparatus of claim 11, wherein the search space comprises a d×d grid, and wherein the surrogate model is rendered over the d×d grid.

19. A method of video tracking comprising:
selecting an exemplar crop to be tracked in an initial frame of a video;
applying Bayesian optimization with each subsequent frame of the video by:
building a surrogate model of an objective function using Gaussian Process Regression (GPR) based on similarity scores of candidate crops collected from a search space in a current frame of the video; and
determining where to proficiently obtain a next candidate crop in the search space using an acquisition function;
comparing the next candidate crop to the exemplar crop using a Siamese neural network; and
continuing comparison of a new candidate crop to the exemplar crop using the Siamese neural network until the exemplar crop has been found in the current frame, wherein the new candidate crop is selected based on an updated surrogate model.

20. The method of claim 19, wherein building a surrogate model of the objective function comprises:
obtaining candidate crops of an image in the search space of the current frame of the video;
obtaining a similarity score for each of the candidate crops by passing each of the candidate crops through the Siamese neural network; and
drawing a graph over the image using each similarity score from each of the candidate crops to interpolate similarity scores of locations in the frame that have not yet been sampled.

21. The method of claim 19, wherein determining where to proficiently obtain the next candidate crop in the search space using the acquisition function comprises:
applying the acquisition function to each of the candidate crops in the search space to obtain an approximation of a similarity score for the candidate crops as if each of the candidate crops had been passed through a Siamese network without passing the candidate crops through the Siamese network; and
selecting a candidate crop from the search space that has a maximum acquisition function result as the next candidate crop.

22. The method of claim 19, wherein the acquisition function comprises a memory-score expected-improvement (MS-EI) acquisition function.

23. The method of claim 19, wherein comparing the next candidate crop to the exemplar object comprises:
- passing the next candidate crop through the Siamese network to obtain a similarity score;
- updating the surrogate model with the new similarity score; and
- finding a maximum point on the updated surrogate model to use as the new candidate crop.

24. The method of claim 19, wherein the surrogate model formulates a graph of hills and valleys representative of a location of a tracked object in each frame of the video.

25. The method of claim 19, wherein the Siamese neural network is trained as a general object similarity function.

* * * * *